US006850814B2

(12) United States Patent
Kamiya

(10) Patent No.: US 6,850,814 B2
(45) Date of Patent: Feb. 1, 2005

(54) MACHINING PROGRAM PREPARATION APPARATUS

(75) Inventor: Takashi Kamiya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 281 days.

(21) Appl. No.: 10/258,352

(22) PCT Filed: May 17, 2001

(86) PCT No.: PCT/JP01/04111

§ 371 (c)(1),
(2), (4) Date: Oct. 23, 2002

(87) PCT Pub. No.: WO02/095512

PCT Pub. Date: Nov. 28, 2002

(65) Prior Publication Data

US 2003/0130757 A1 Jul. 10, 2003

(51) Int. Cl.[7] .............................................. G06F 19/00
(52) U.S. Cl. .......................... 700/182; 700/98; 700/118
(58) Field of Search ............................ 700/86, 98, 117, 700/159–161, 118, 163, 164, 182–184, 193

(56) References Cited

U.S. PATENT DOCUMENTS

| | | | | | |
|---|---|---|---|---|---|
| 5,223,777 | A | * | 6/1993 | Werner et al. | 318/569 |
| 5,251,143 | A | * | 10/1993 | Maeda | 700/176 |
| 5,351,196 | A | * | 9/1994 | Sowar et al. | 700/182 |
| 5,369,592 | A | * | 11/1994 | Honda | 700/187 |
| 5,796,618 | A | * | 8/1998 | Maeda et al. | 700/182 |
| 5,847,958 | A | * | 12/1998 | Shaikh et al. | 700/119 |
| 5,993,042 | A | | 11/1999 | Matsubara et al. | |
| 6,044,309 | A | * | 3/2000 | Honda | 700/187 |
| 6,120,171 | A | * | 9/2000 | Shaikh | 700/98 |
| 6,606,090 | B2 | * | 8/2003 | Shimamura | 345/419 |
| 6,675,060 | B1 | * | 1/2004 | Matsubara et al. | 700/182 |
| 6,676,344 | B1 | * | 1/2004 | Amatt | 409/132 |
| 6,745,100 | B1 | * | 6/2004 | Lermuzeaux | 700/187 |

FOREIGN PATENT DOCUMENTS

| | | |
|---|---|---|
| EP | 1087277 A2 * | 3/2001 |
| JP | 60-62431 | 4/1985 |
| JP | 62-67607 | 3/1987 |
| JP | 3-166039 | 7/1991 |
| JP | HEI 5-197412 | 8/1993 |
| JP | HEI 10-143222 | 5/1998 |

OTHER PUBLICATIONS

Fujio Yamaguchi, CAD Engineering Information Mathematical Series B–3, pp. 147–149, p. 249–253, Feb. 27, 1998.

* cited by examiner

Primary Examiner—Maria N. Von Buhr
(74) Attorney, Agent, or Firm—Sughrue Mion, PLLC

(57) ABSTRACT

A machining program preparation apparatus includes a machining region extracting unit (3) that extracts a machining region (300) based on a given three-dimensional part shape (100) and a given three-dimensional material shape (200), an envelope shape generating unit (4) that generates a three-dimensional envelope shape (400) that envelopes the given three-dimensional part shape (100) based on this part shape, a turning region extracting unit (5) that extracts a three-dimensional turning region (500) from the material shape (200) and the envelope shape (400), and a milling region extracting unit (6) that extracts a three-dimensional milling region (600) from the machining region (300) extracted by the machining region extracting unit (3) and the turning region (500) extracted by the turning region extracting unit (5).

8 Claims, 22 Drawing Sheets

FIG.12
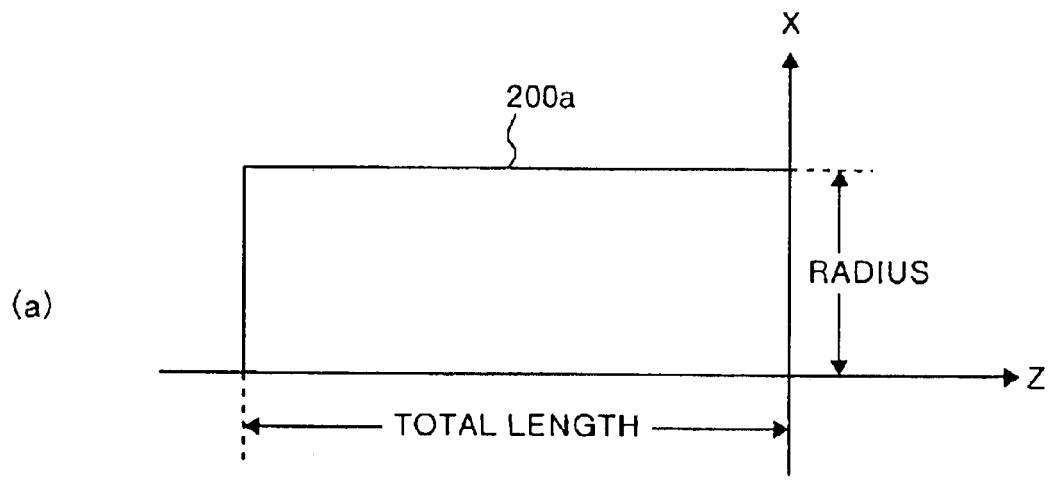
(a)
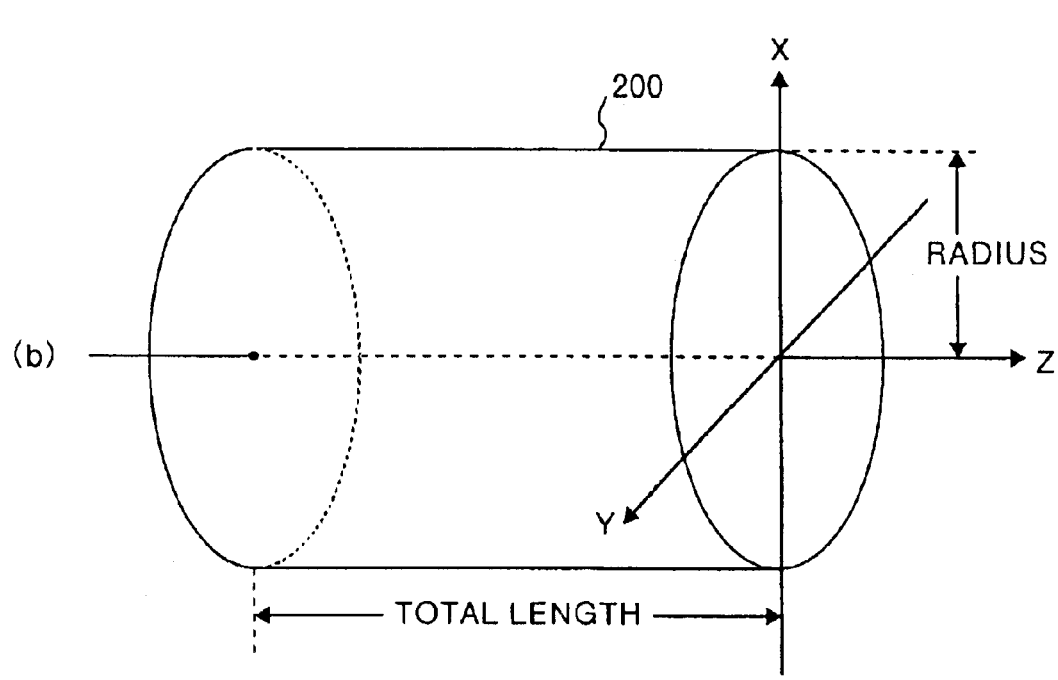
(b)

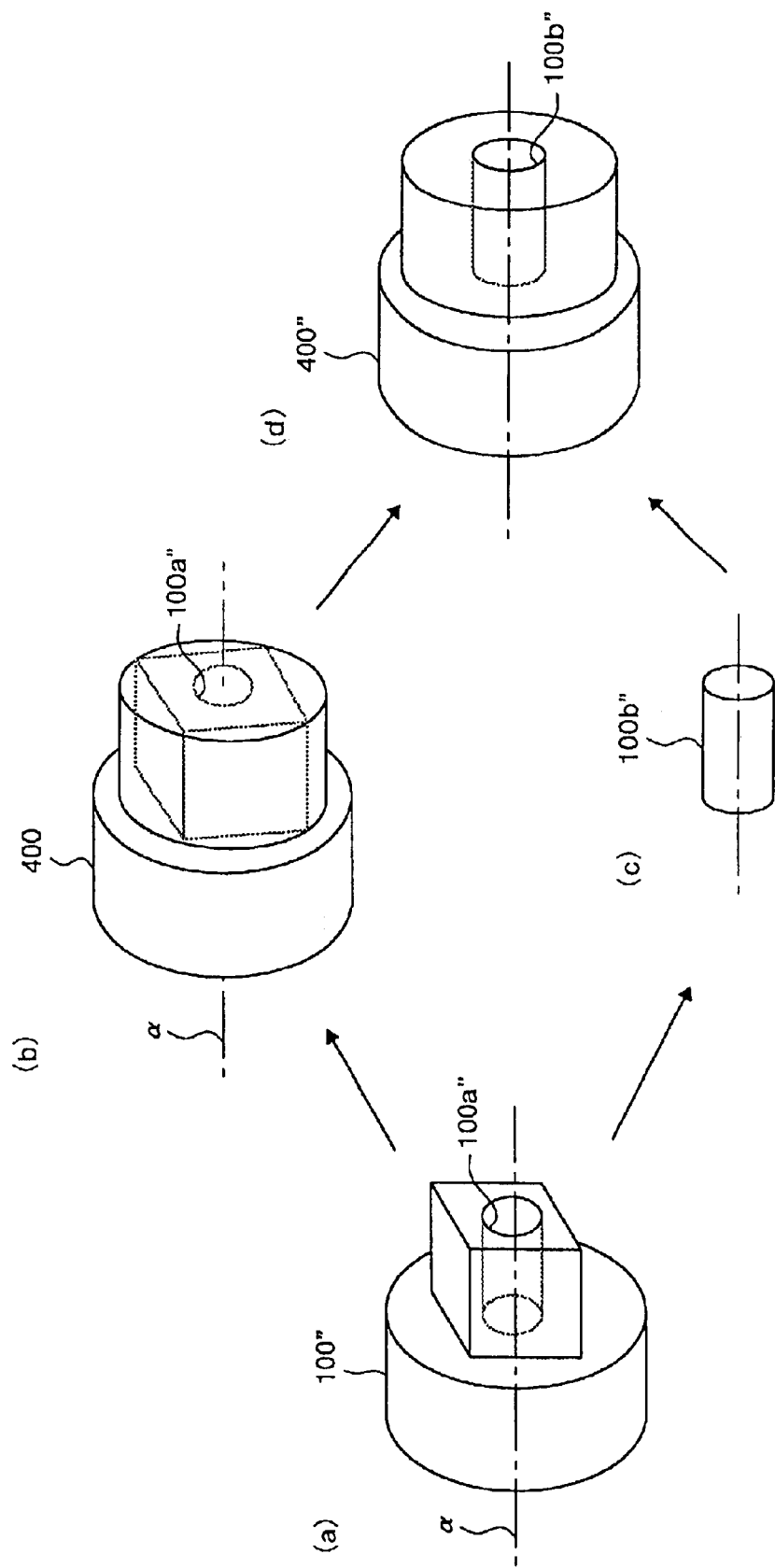

MACHINING PROGRAM PREPARATION APPARATUS

TECHNICAL FIELD

The present invention relates to an apparatus that prepares a machining program for a machining center that executes milling and turning.

BACKGROUND ART

Conventionally, an apparatus that prepares a machining program from a three-dimensional part shape is disclosed in, for example, Japanese Patent Application Laid-Open No. HEI 10-143222. This conventional technique is used to prepare a machining program that makes a machining center execute milling including a pocket machining portion and a hole machining portion. In other words, according to this conventional technique, first, a three-dimensional part shape including a pocket machining portion and a hole machining portion is input, and a machining region is extracted from the input part shape and material shape through three-dimensional shape processing. The extracted machining region is divided on a plane perpendicular to a Z axis, thereby to extract a pocket machining region and a point machining region, and prepare tool movement command data. According to this conventional technique, it is possible to prepare movement command data of a tool directly from the three-dimensional machined shape. Therefore, the machining program preparation work becomes extremely easy.

In order to obtain a part of a desired shape, in many cases, turning becomes necessary as well as milling. However, the conventional machining program preparation apparatus carries out only milling including a pocket machining portion and a hole machining portion, and does not carry out multi-machining including milling and turning. Therefore, in order to prepare a machining program for executing the multi-machining including milling and turning, an operator must divide the multi-machining into a turning step and a milling step while looking at the shape of the part. Consequently, the work becomes complicated, and the skill for accurately discriminating between the turning step and the milling step becomes necessary.

Therefore, the present invention has been achieved to solve the above problems. It is an object of the invention to provide an apparatus that can easily prepare a machining program for executing multi-machining including milling and turning.

DISCLOSURE OF THE INVENTION

The machining program preparation apparatus according to the invention prepares a machining program for a machining center that executes milling and turning. The apparatus includes: a machining region extracting unit that extracts a machining region based on a given three-dimensional part shape and a given three-dimensional material shape; an envelope shape generating unit that generates a three-dimensional envelope shape that envelopes a given three-dimensional part shape based on this shape; a turning region extracting unit that extracts a three-dimensional turning region from the material shape and the envelope shape; and a milling region extracting unit that extracts a three-dimensional milling region from the machining region extracted by the machining region extracting unit and the turning region extracted by the turning region extracting unit.

According to this invention, it is possible to obtain a three-dimensional shape of the turning region and a three-dimensional shape of the milling region from the three-dimensional part shape and material shape.

In the machining program preparation apparatus according to the next invention based on the above invention, the envelope shape generating unit sets a turning axial core that becomes a rotation axis at the time of the turning, prepares a cross-sectional shape that passes through a point farthest from the turning axial core among end points of the part shape, and generates an envelope shape by rotating the cross-sectional shape around the turning axial core.

According to this invention, it is possible to prepare an envelope shape using a turning axial core as a rotation axis based on a given part shape.

The machining program preparation apparatus according to the next invention further comprises: a material shape setting unit that sets information for a two-dimensional shape of a material; and a material shape generating unit that generates a three-dimensional material shape based on the two-dimensional shape information set by the material shape setting unit, and gives the generated shape to the machining region extracting unit and the turning region extracting unit.

According to this invention, when the two-dimensional shape information is set through the material shape setting unit, the material shape generating unit can generate a three-dimensional material shape.

The machining program preparation apparatus according to the next invention based on the above invention further comprises: a part shape setting unit that sets correction information of a part shape to a given three-dimensional part shape; and a part shape correcting unit that makes a correction to the three-dimensional part shape based on the correction information set by the part shape setting unit, and gives the corrected shape to the machining region extracting unit and the envelope shape generating unit.

According to this invention, when the correction information of the part shape is set through the part shape setting unit, the part shape correcting unit can make a correction to the part shape.

The machining program preparation apparatus according to the next invention based on the above invention further comprises: a material quality setting unit that sets material information to a given material shape; and a turning region correcting unit that makes a correction to the turning region based on the material information set by the material quality setting unit, and gives the corrected turning region to the milling region extracting unit.

According to this invention, when the material information is set through the material quality setting unit, the turning region correcting unit can make a correction to the turning region.

The machining program preparation apparatus according to the next invention based on the above invention further comprises: a tool information setting unit that sets information relating to tools of the machining center; and a turning region correcting unit that makes a correction to the turning region based on the information relating to the tool set by the tool information setting unit, and gives the corrected turning region to the milling region extracting unit.

According to this invention, when the information relating to tools is set through the tool information setting unit, the turning region correcting unit can make a correction to the turning region.

The machining program preparation apparatus according to the next invention based on the above invention further comprises: a machine information setting unit that sets information relating to the machining center; and a turning region correcting unit that makes a correction to the turning region based on the information relating to the machining center set by the machine information setting unit, and gives the corrected turning region to the milling region extracting unit.

According to this invention, when the information relating to the machining center is set through the machine information setting unit, the turning region correcting unit can make a correction to the turning region.

The machining program preparation apparatus according to the next invention based on the above invention further comprises: an internal hollow portion shape generating unit that generates a hollow portion-equivalent shape corresponding to an internal hollow portion when a given three-dimensional part shape has the internal hollow portion that can be turned; and an envelope shape correcting unit that makes a correction to the envelope shape based on the hollow portion-equivalent shape generated by the internal hollow portion shape generating unit, and gives the corrected shape to the turning region extracting unit.

According to this invention, when the three-dimensional part shape has an internal hollow portion that can be turned, the internal hollow portion shape generating unit generates a hollow portion-equivalent shape. Further, the envelope shape generating unit makes a correction to the envelope shape so as to envelope the hollow portion-equivalent shape.

BRIEF DESCRIPTION OF THE DRAWINGS

FIG. 12(a) is a conceptual diagram which shows two-dimensional shape information that has been input from the material shape setting unit in the machining program preparation apparatus of the second embodiment; FIG. 12(b) is a conceptual diagram which shows the operation that the material shape generating unit generates a three-dimensional material shape from the two-dimensional shape information that has been input from the material shape setting unit;

FIG. 23(a) is a perspective view of a part shape having an internal hollow portion that has been input from a part shape input unit 1 in the machining program preparation apparatus of the seventh embodiment; FIG. 23(b) is a perspective view which shows an envelope shape that has been generated from the part shape shown in FIG. 23(a); FIG. 23(c) is a perspective view of a hollow portion-equivalent shape that has been generated from the part shape shown in FIG. 23(a); and FIG. 23(d) is a perspective view of a corrected envelope shape that has been generated based on the envelope shape shown in FIG. 23(b) and the hollow portion-equivalent shape shown in FIG. 23(c).

BEST MODE FOR CARRYING OUT THE INVENTION

Preferred embodiments of the machining program preparation apparatus according to this invention will be explained in detail below with reference to the attached drawings.

Figure 1:
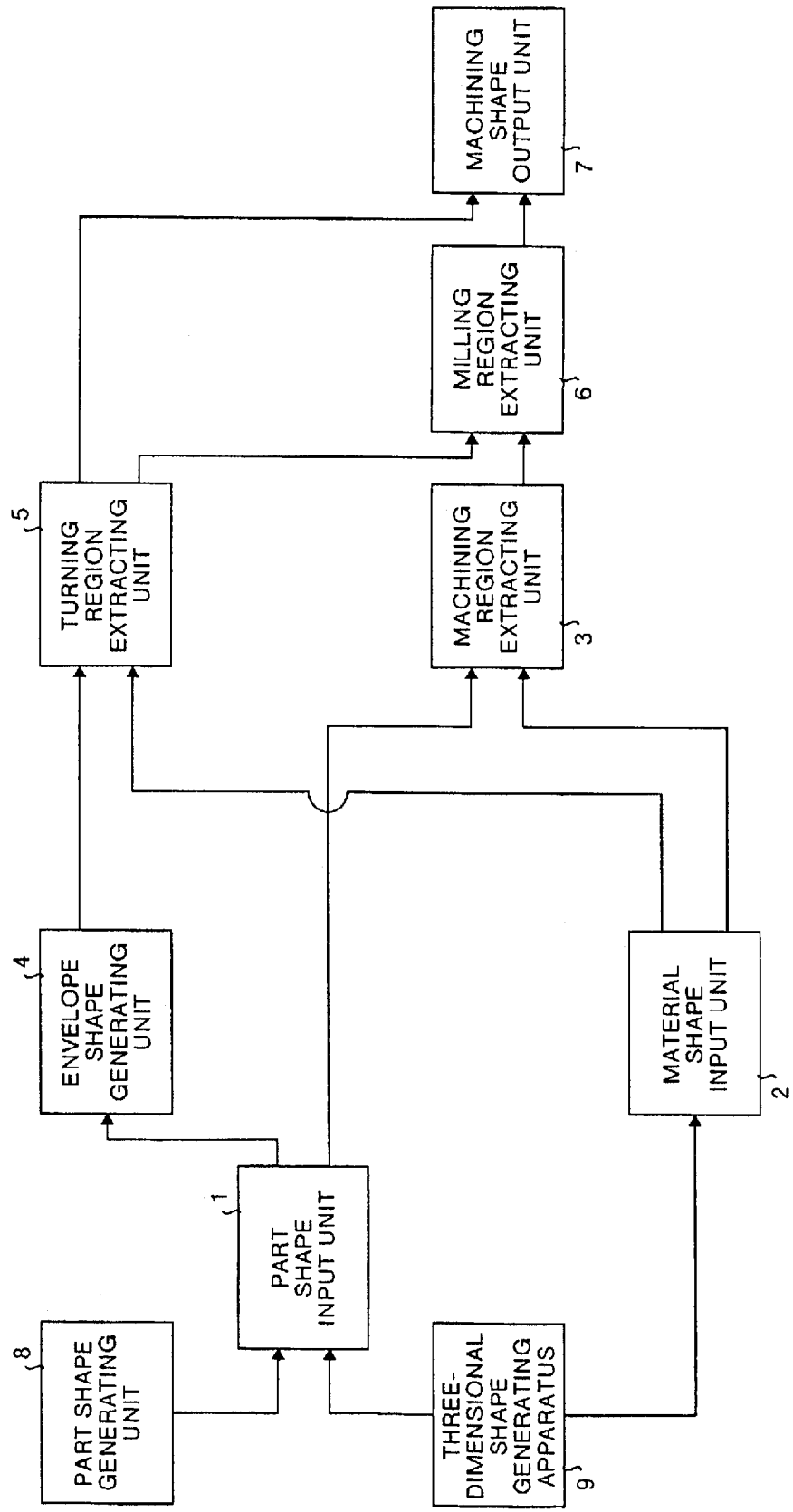
FIG. 1 is a block diagram which shows a structure of a machining program preparation apparatus as a first embodiment of this invention.

First Embodiment:

FIG. 1 is a block diagram which shows the structure of the machining program preparation apparatus as the first embodiment of this invention. As shown in FIG. 1, this machining program preparation apparatus comprises a three-dimensional part shape input unit 1, a material shape input unit 2, a machining region extracting unit 3, an envelope shape generating unit 4, a turning region extracting unit 5, a milling region extracting unit 6, a machining shape output unit 7, and a part shape generating unit 8. The part shape input unit 1 is used to input a three-dimensional part shape to be obtained. The material shape input unit 2 is used to input a three-dimensional material shape to be machined. The machining region extracting unit 3 is used to extract the whole region to be machined based on the material shape that has been input from the material shape input unit 2 and the part shape that has been input from the part shape input unit 1. The envelope shape generating unit 4 is used to generate an envelope shape that envelopes the part shape that has been input from the part shape input unit 1. The turning region extracting unit 5 is used to extract a turning region based on the material shape that has been input from the material shape input unit 2 and the envelope shape that has been generated by the envelope shape generating unit 4. The milling region extracting unit 6 is used to extract a milling region based on the whole shape of the machining region extracted by the machining region extracting unit 3 and the shape of the turning region that has been extracted by the turning region extracting unit 5. The machining shape output unit 7 is used to output the turning region that has been extracted by the turning region extracting unit 5 and the milling region that has been extracted by the milling region extracting unit 6. The part shape generating unit 8 is used to generate a three-dimensional part shape to be input to the part shape input unit 1.

Figure 2:
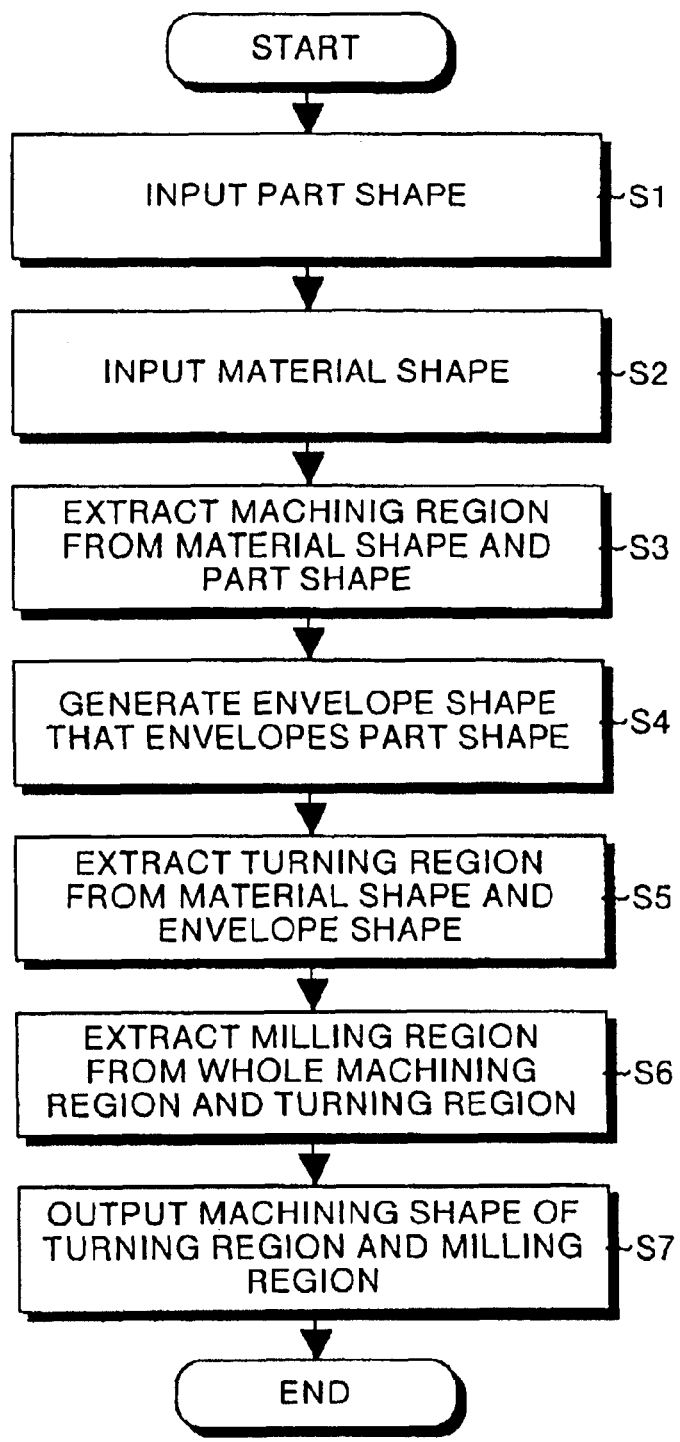
FIG. 2 is a flowchart which shows the operation of the machining program preparation apparatus according to this first embodiment.

FIG. 2 is a flowchart which shows the operation of the machining program preparation apparatus according to this first embodiment. The operation of the machining program preparation apparatus will be explained below with reference to this flowchart.

Figure 3:
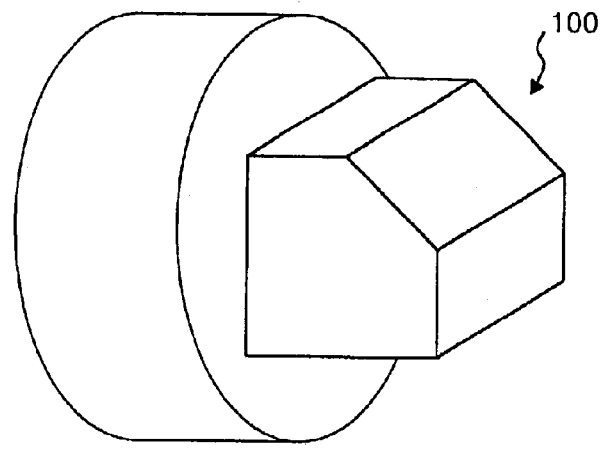
FIG. 3 is a perspective view which shows an example of a part shape that is input through a part shape input unit in the machining program preparation apparatus of the first embodiment.

First, in the machining program preparation apparatus, a three-dimensional part shape to be obtained, for example, a three-dimensional part shape 100 as shown in FIG. 3 is input from the part shape input unit 1 (step S1). In this case, as a method of inputting the part shape 100 to the part shape input unit 1, the shape prepared by the part shape generating unit 8 may be input. A part shape prepared by an external three-dimensional shape generating apparatus 9, in place of the part shape generating unit 8, such as a three-dimensional CAD apparatus widely used in general may be input. Alternatively, a part shape prepared by both the part shape generating unit 8 and the external three-dimensional shape generating apparatus 9 may be input.

Figure 4:
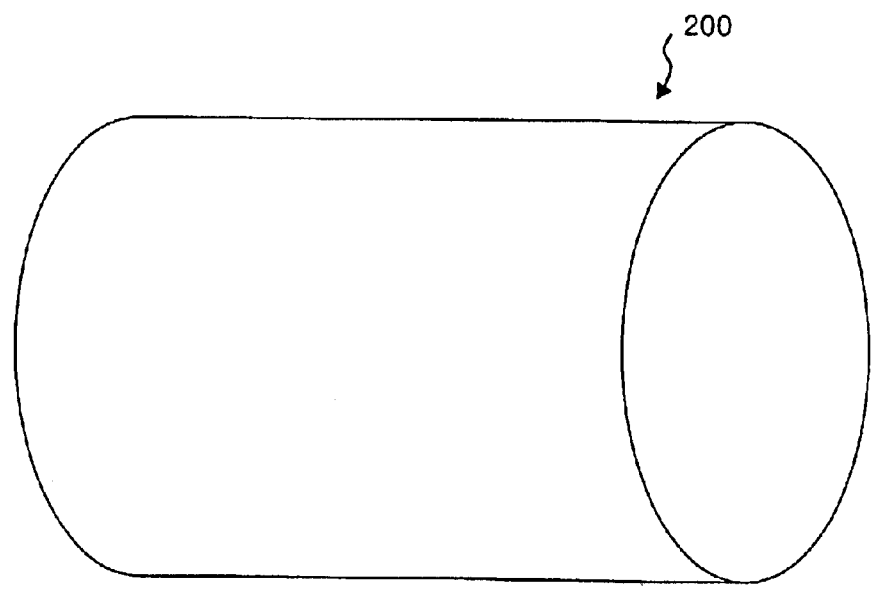
FIG. 4 is a perspective view which shows an example of a material shape that is input through a material shape input unit in the machining program preparation apparatus of the first embodiment.

Next, a three-dimensional material shape 200 is input from the material shape input unit 2 (step S2). The material shape 200 is a shape of a material of the part to be obtained. Specifically, when the three-dimensional part shape 100 is as shown in FIG. 3, a cylindrical material shape 200 as shown in FIG. 4 may be input. A method of inputting the material shape 200 is the same as the method of inputting the three-dimensional part shape 100 explained above.

The part shape 100 input from the part shape input unit 1 is given to the machining region extracting unit 3 and the envelope shape generating unit 4. On the other hand, the material shape 200 input from the material shape input unit 2 is given to the machining region extracting unit 3 and the turning region extracting unit 5.

Figure 5:
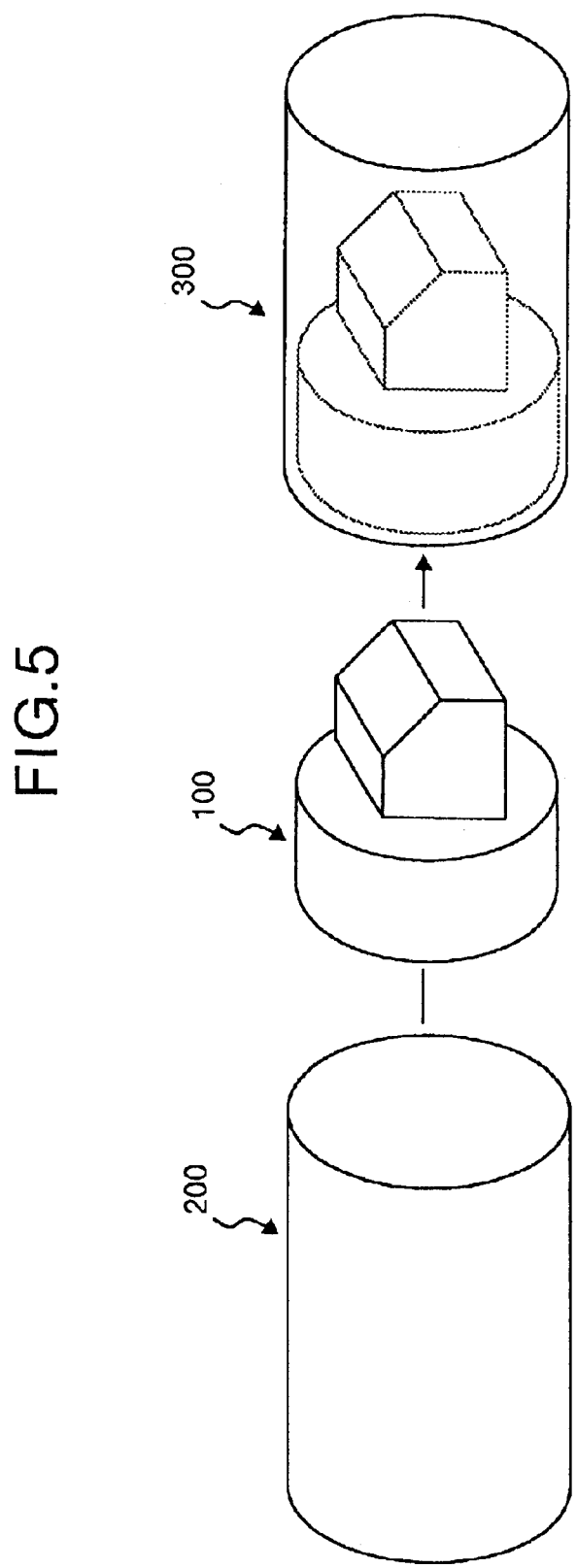
FIG. 5 is a perspective view which shows the operation of extracting a machining region based on a part shape and a material shape in the machining program preparation apparatus of the first embodiment.

The machining region extracting unit 3 that has been given the part shape 100 and the material shape 200 extracts a shape of the whole region to be machined based on both shapes (step S3). Specifically, as shown in FIG. 5, a differential shape between the material shape 200 input from the material shape input unit 2 and the part shape 100 input from the part shape input unit 1 is extracted as the whole shape of a machining region 300. In other words, a final part shape portion is removed from the material shape 200 to be machined, based on three-dimensional shape processing, thereby to leave a shape that must be machined. In this machining, the material shape 200 and the part shape 100 are used as three-dimensional shape models of solid models respectively, and it is possible to generate a differential shape based on a set operation of the solid models. A machining method according to this solid model is a known technique as has been shown in "Chapter 6 Solid modeling (1)" and "Chapter 12 Solid modeling (2)" in the document "Information Mathematical Series B-3, Fujio YAMAGUCHI, CAD Engineering Baifukan", for example. This technique is similarly applied to the turning region extracting unit 5 and the milling region extracting unit 6 to be described later, other than the machining region extracting unit 3.

Figure 6:
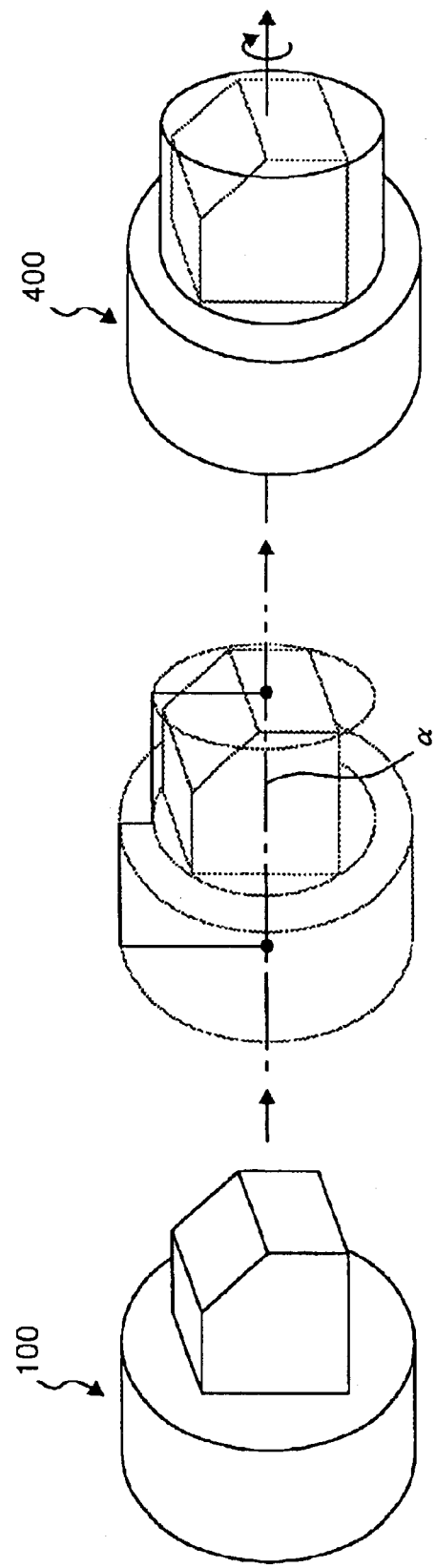
FIG. 6 is a perspective view which shows the operation of generating an envelope shape based on the part shape that has been input from the part shape input unit in the machining program preparation apparatus of the first embodiment.

Next, the envelope shape generating unit 4 that has been given the part shape 100 from the part shape input unit 1 generates an envelope shape 400 that envelopes the part shape 100 (step S4). For example, in an example shown in FIG. 6, a turning axial core L that becomes a rotation axis at the time of turning is set. At the same time, a cross-sectional shape that passes through a point farthest from the turning axial core a among end points of the part shape 100 is prepared. A three-dimensional shape that is structured when rotating the cross-sectional shape around the turning axial core at is generated as the envelope shape 400. In other words, the envelope shape generating unit 4 generates the rotary envelope shape 400 that can be determined as being able to be turned based on the part shape 100 input through the part shape input unit 1.

Figure 7:
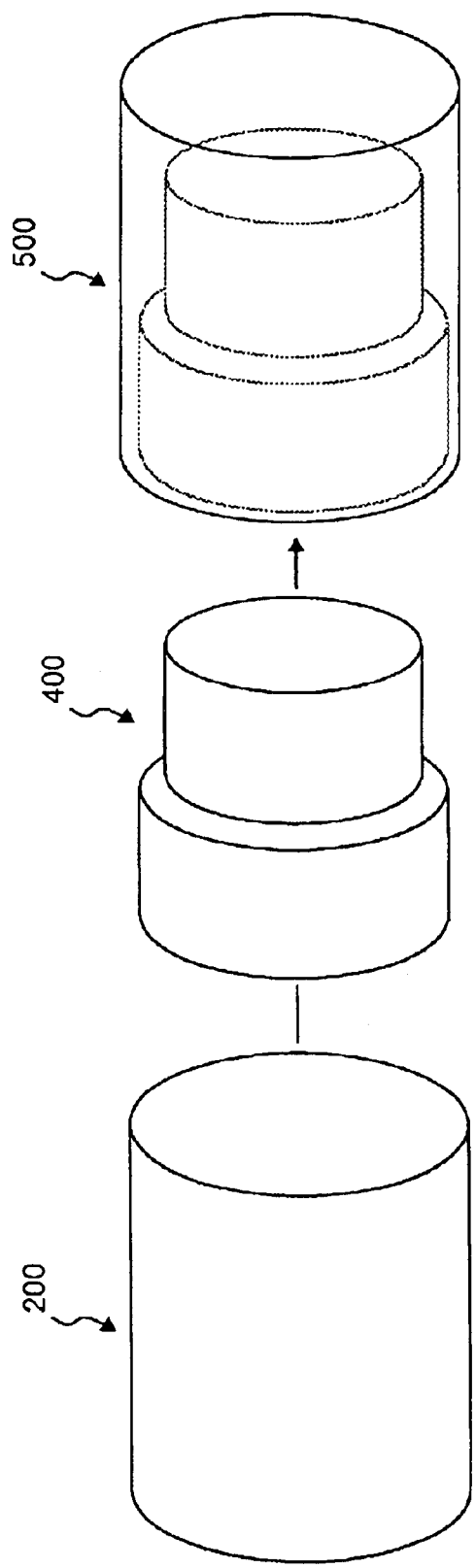
FIG. 7 is a perspective view which shows the operation of extracting a turning region from the material shape that has been input through the material shape input unit and the envelope shape that has been generated by an envelope shape generating unit in the machining program preparation apparatus of the first embodiment.

Next, in the machining program preparation apparatus, the turning region extracting unit 5 executes the processing for extracting a turning region 500 based on the material shape 200 given from the material shape input unit 2 and the envelope shape 400 given from the envelope shape generating unit 4 (step S5). As described above, the envelope shape 400 given from the envelope shape generating unit 4 is a rotary shape that can be turned. Therefore, in the above processing, it is possible to extract a differential shape between the material shape 200 input from the material shape input unit 2 and the envelope shape 400 input from the envelope shape generating unit 4, as the turning region 500 that can be removed by the turning, as shown in FIG. 7. In other words, the turning region extracting unit 5 leaves a three-dimensional shape of a machining region that can be machined by the turning, by removing the envelope shape 400 from the material shape 200 based on the processing for the three-dimensional shape.

Figure 8:
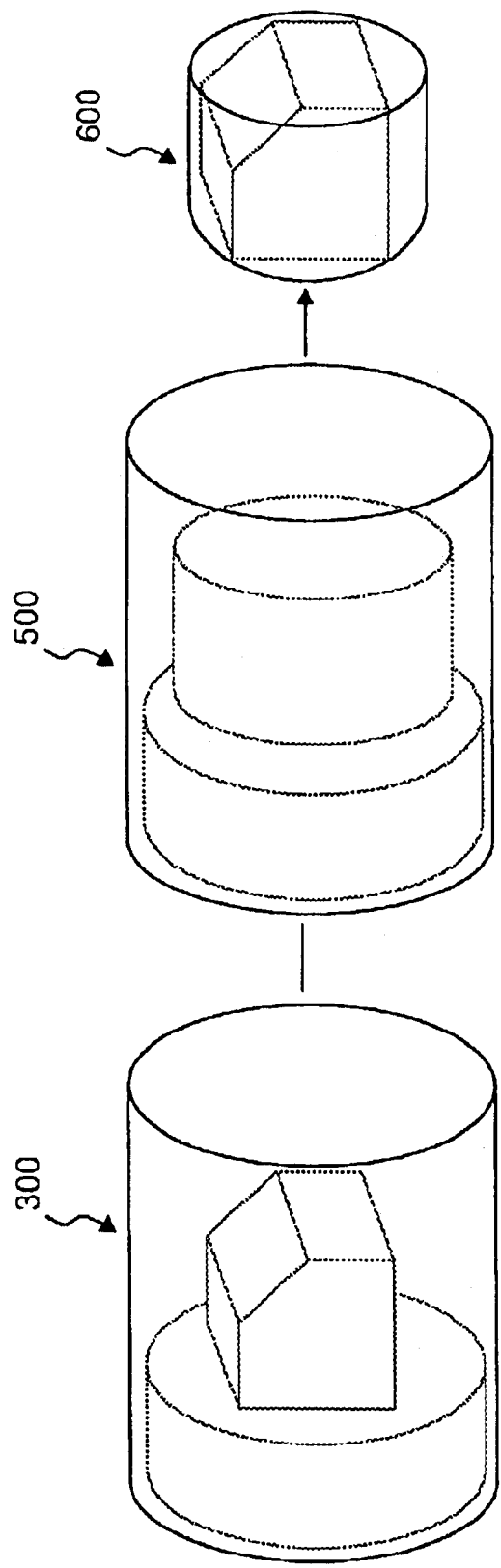
FIG. 8 is a perspective view which shows the operation of extracting a milling region from the machining region that has been given from the machining region extracting unit and the turning region that has been given from the turning region extracting unit in the machining program preparation apparatus of the first embodiment.

Next, in the machining program preparation apparatus, the milling region extracting unit 6 extracts a milling region 600 based on the machining region 300 given from the machining region extracting unit 3 and the turning region 500 given from the turning region extracting unit 5 (step S6). Specifically, as shown in FIG. 8, a differential shape between the three-dimensional shape of the machining region 300 that has been extracted by the machining region extracting unit 3 and the three-dimensional shape of the turning region 500 that has been extracted by the turning region extracting unit 5 is extracted as a three-dimensional shape of the milling region 600 that must be removed by the milling.

Lastly, the machining shape output unit 7 outputs the three-dimensional shape of the turning region 500 extracted by the turning region extracting unit 5, and the three-dimensional shape of the milling region 600 extracted by the milling region extracting unit 6 (step S7).

Thereafter, in a similar manner to that of the above Japanese Patent Application Laid-open No. H10-143222, for example, regarding the turning region 500 and the milling region 600 that have been output from the machining shape output unit 7, the respective machining regions 500 and 600 are suitably divided. At the same time, the machining orders of the divided machining regions are set, and further, machining information of the machining regions is input. With this arrangement, it becomes possible to prepare a machining program that describes tool movement command data, based on these machining orders and machining information.

As explained above, according to the machining program preparation apparatus, the three-dimensional shape of the turning region 500 to be machined at the turning step is output separately from the three-dimensional shape of the milling region 600 to be machined at the milling step, based on the three-dimensional part shape 100 and material shape 200. Therefore, even through multi-machining including the milling and the turning is to be carried out, it is not necessary for the operator to separate the turning step from the milling step while looking at the part shape 100. As a result, it becomes possible to easily prepare a machining program based on a process design that accurately separates the turning step from the milling step, without requiring skill.

Figure 9:
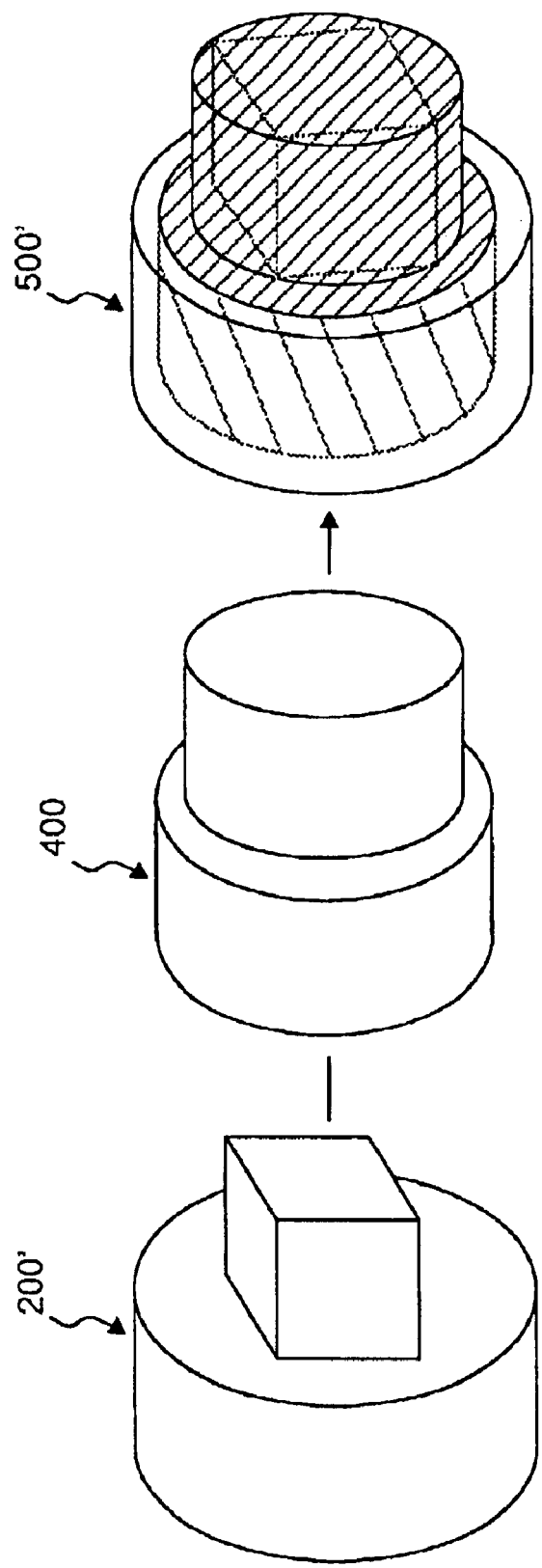
FIG. 9 is a perspective view which shows the operation of extracting a turning region from the part shape and the envelope shape when the part shape that is different from that shown in FIG. 3 has been input from the part shape input unit in the machining program preparation apparatus of the first embodiment.

Although the cylindrical shape as shown in FIG. 4 is explained as the three-dimensional material shape 200 that is input from the material shape input unit 2, it is also possible to use a molded shape other than the cylindrical shape, as shown in FIG. 9. In the instance of a material shape 200' shown in FIG. 9, when a differential shape between the material shape 200' and the envelope shape 400 including the part shape 100 is extracted as the turning region 500 at step S5, the envelope shape 400 becomes larger than the material shape 200'. However, in this case, the envelope shape 400 larger than the material shape 200' is removed based on the three-dimensional shape processing for extracting the differential shape. Consequently, it is possible to extract the portion of the material shape 200' that becomes the outside of the envelope shape 400, as a turning region 500'.

Second Embodiment:

A second embodiment of this invention will be explained.

Figure 10:
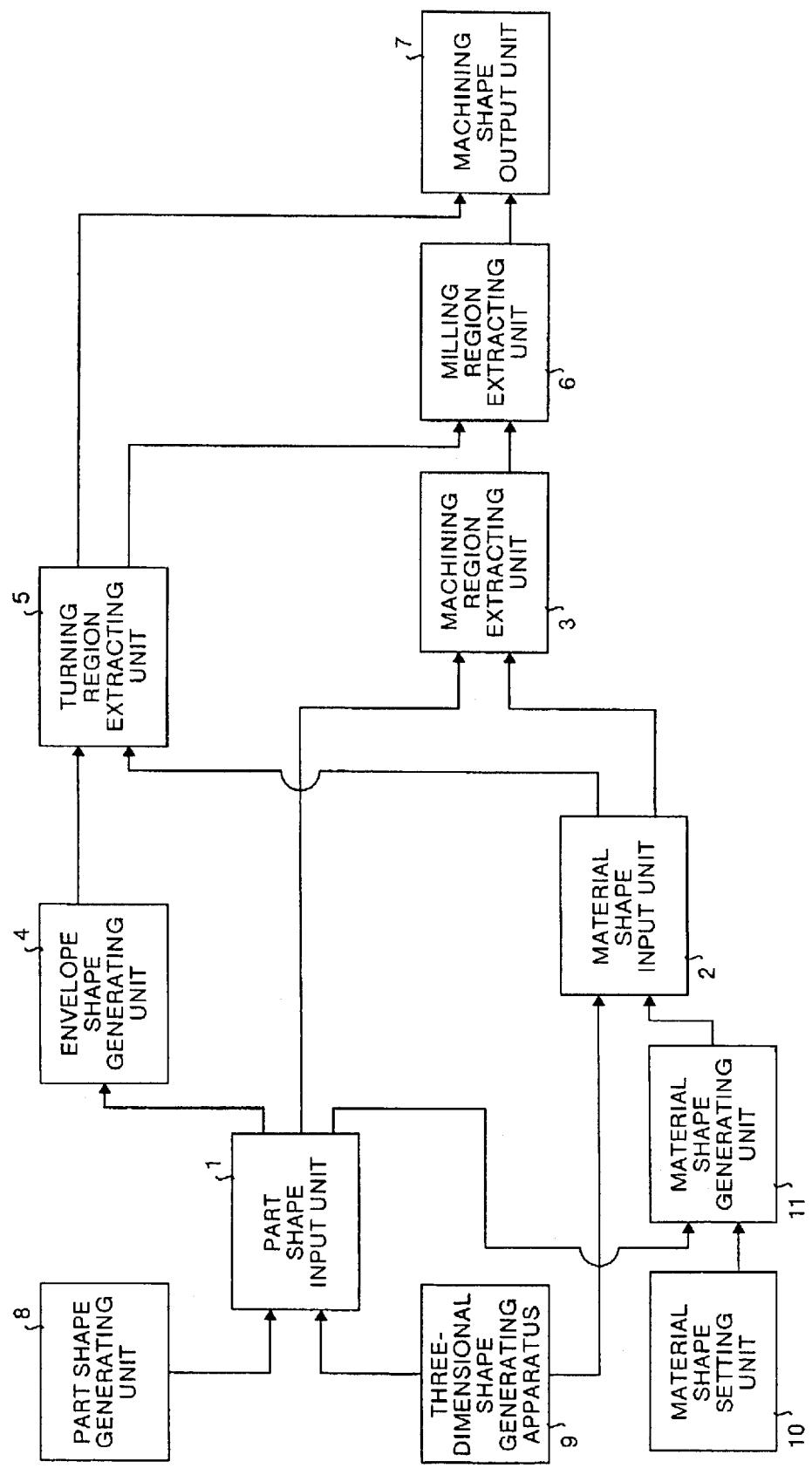
FIG. 10 is a block diagram which shows a structure of a machining program preparation apparatus as a second embodiment of this invention.

FIG. 10 is a block diagram which shows the structure of the machining program preparation apparatus as the second embodiment of this invention. As is clear from FIG. 10, the machining program preparation apparatus of the second embodiment further comprises a material shape setting unit 10 and a material shape generating unit 11 in the machining program preparation apparatus of the first embodiment shown in FIG. 1. In FIG. 10, components equivalent to or corresponding to those in FIG. 1 will be attached with the same reference symbols, and their detailed explanation will be omitted.

Figure 11:
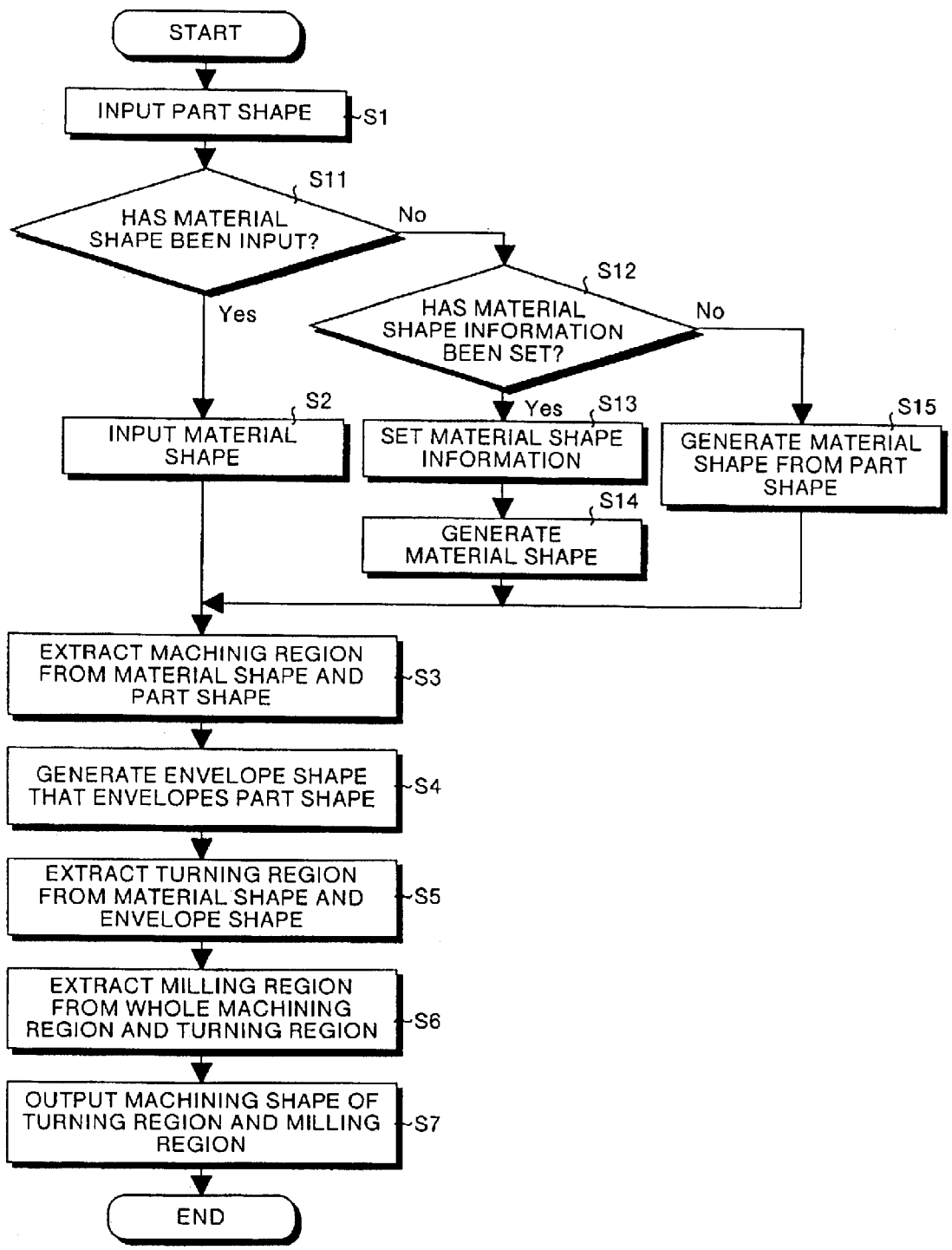
FIG. 11 is a flowchart which shows the operation of the machining program preparation apparatus of the second embodiment shown in FIG. 10.

FIG. 11 is a flowchart which shows the operation of the machining program preparation apparatus of the second embodiment shown in FIG. 10. The operation of the machining program preparation apparatus will be explained below with reference to this flowchart. In FIG. 11, portions equivalent to or corresponding to those in FIG. 2 will also be attached with the same reference symbols, and their detailed explanation will be omitted.

First, in the machining program preparation apparatus, at step S1, after the three-dimensional part shape 100 to be obtained input from the part shape input unit 1, the three-dimensional material shape 200 is input (step S2). The three-dimensional material shape 200 shown in FIG. 4 is a simple cylindrical shape, and it is not always necessary to prepare this shape with the external three-dimensional shape generating apparatus 9 like the three-dimensional CAD apparatus and input the shape from the material shape input unit 2. For example, when numerical values of a total length and a radius are input as shown in FIG. 12(a), it is possible to prepare a reference cross-sectional shape 200a that specifies a cylindrical shape from these numerical values. Further, when the prepared cross-sectional shape 200a is used as a rotary unit around a rotation axial core, it is possible to generate the material shape 200 that is a three-dimensional cylindrical shape, as shown in FIG. 12 (b). When the material shape 200 can be prepared from the two-dimensional shape like this, the material shape setting unit 10 may input two-dimensional shape information, and the material shape generating unit 11 may generate the three-dimensional material shape 200, without going through the step S2 (step S11, step S12, step S13, step S14).

Further, it is also possible to prepare the material shape 200 from the part shape 100 that has been input from the part shape input unit 1, without using the material shape setting unit 10. In other words, it is also possible to generate the envelope material shape 200, by taking into account a total length and an external diameter as well as a margin of the part shape 100. For example, when a cylindrical shape is generated for the part shape 100 shown in FIG. 3 by taking into account a total length and an external diameter as well as a margin, a cylindrical shape that includes the part shape 100 is prepared. This cylindrical shape can be used as the material shape 200 (step S15).

Thereafter, the processing same as that in the flowchart shown in FIG. 2 is carried out. Based on this, the three-dimensional shape of the turning region 500 to be machined at the turning step is output separately from the three-dimensional shape of the milling region 600 to be machined at the milling step, based on the three-dimensional part shape 100 and material shape 200. Therefore, even if multi-machining including the milling and the turning is to be carried out, it is not necessary for the operator to separate the turning step from the milling step while looking at the part shape 100. As a result, it becomes possible to easily prepare a machining program based on the process design that accurately separates the turning step from the milling step, without requiring skill.

Third Embodiment:

A third embodiment of this invention will be explained below.

Figure 13:
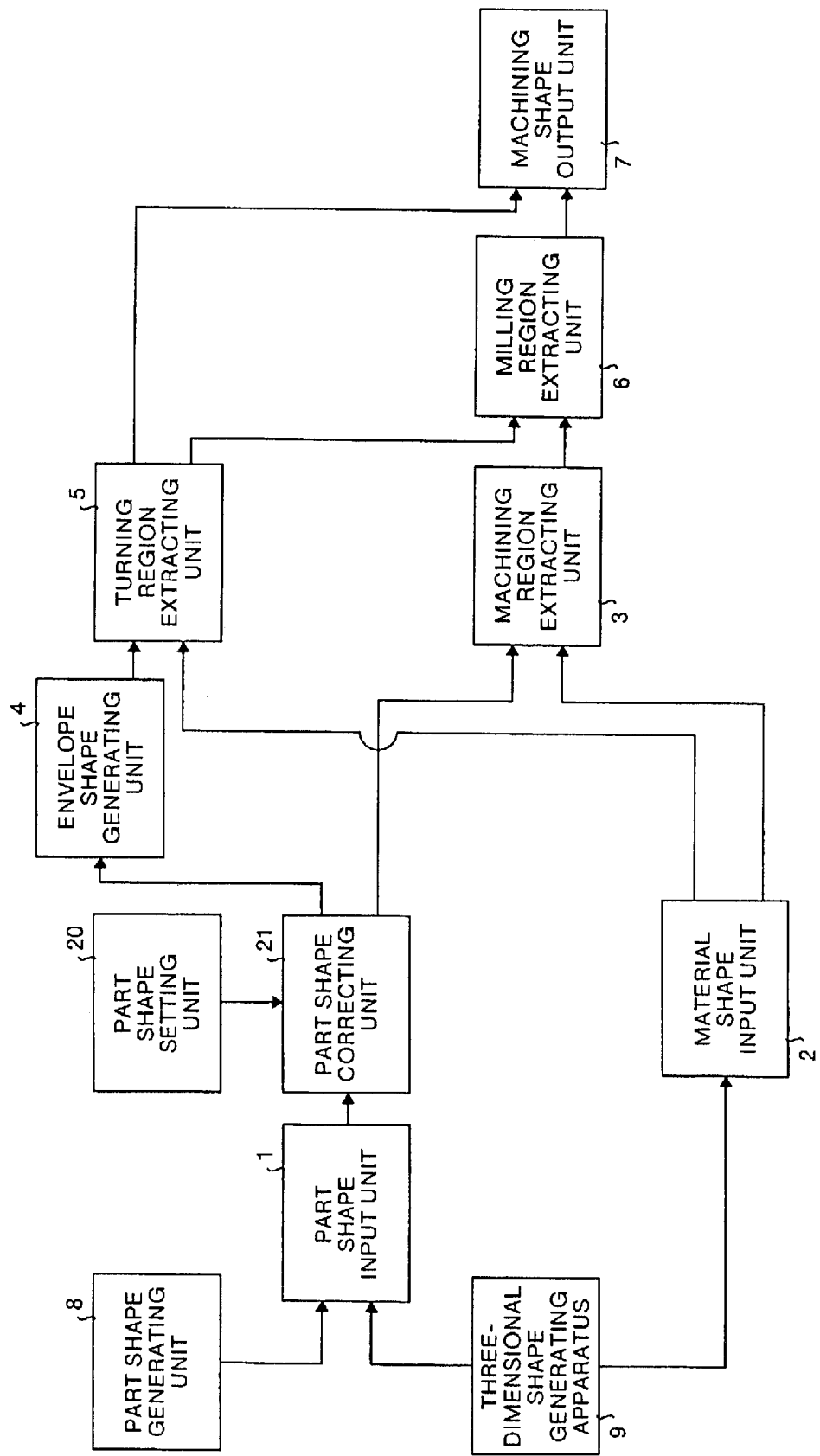
FIG. 13 is a block diagram which shows a structure of a machining program preparation apparatus as a third embodiment of this invention.

FIG. 13 is a block diagram which shows the structure of a machining program preparation apparatus as the third embodiment of this invention. As is clear from FIG. 13, the machining program preparation apparatus of the third embodiment further comprises a part shape setting unit 20 and a part shape correcting unit 21 in the machining program preparation apparatus of the first embodiment shown in FIG. 1. The part shape setting unit 20 is used to set a correction method and a correction quantity to the three-dimensional part shape 100 that has been input from the part shape input unit 1. The part shape correcting unit 21 is used to correct the three-dimensional part shape 100 based on the correction method and the correction quantity that have been set by the part shape setting unit 20. In FIG. 13, components equivalent to or corresponding to those in FIG. 1 will be attached with the same reference symbols, and their detailed explanation will be omitted.

Figure 14:
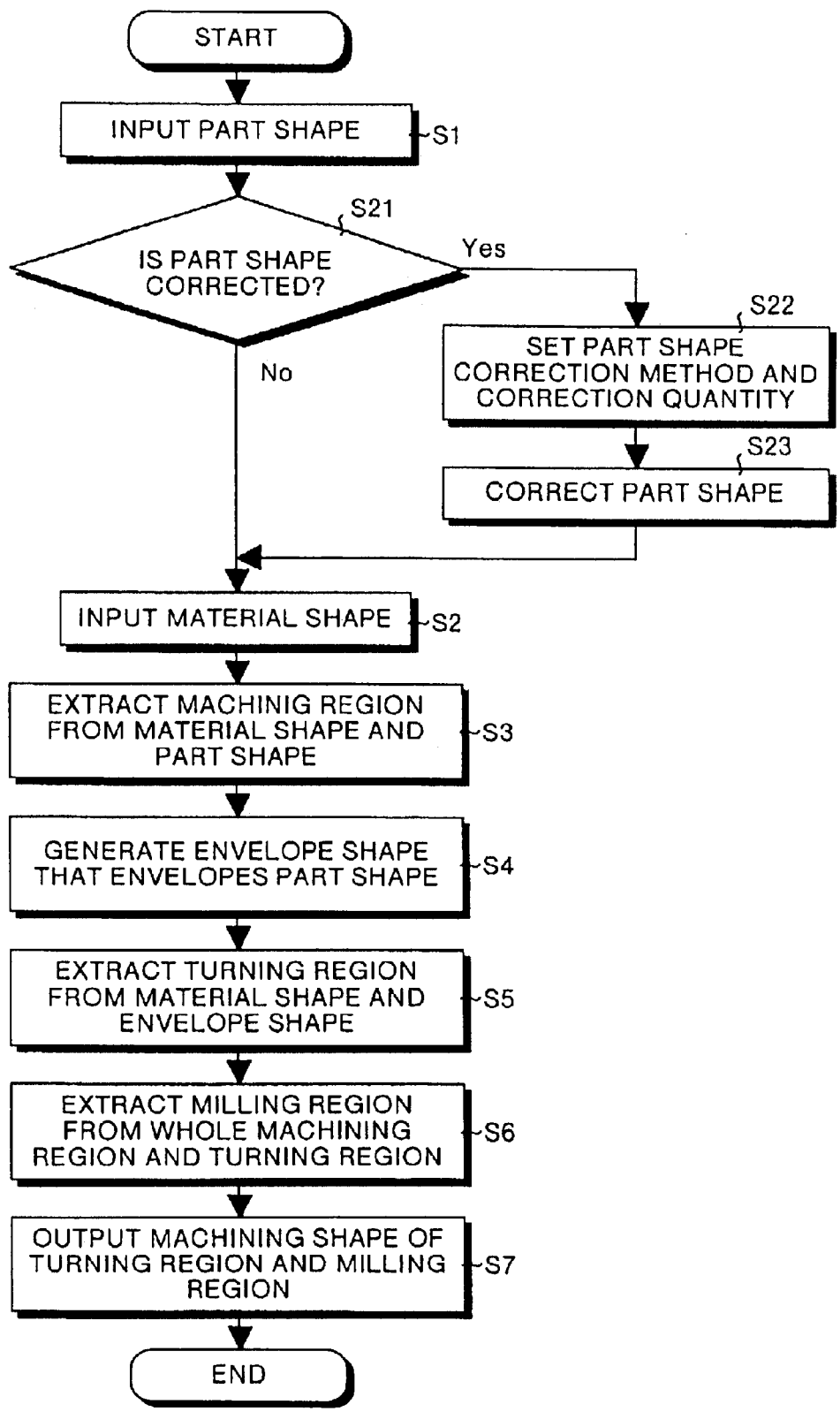
FIG. 14 is a flowchart which shows the operation of the machining program preparation apparatus of the third embodiment.

FIG. 14 is a flowchart which shows the operation of the machining program preparation apparatus of the third embodiment. The operation of the machining program preparation apparatus will be explained below with reference to this flowchart. In FIG. 14, portions equivalent to or corresponding to those in FIG. 2 will also be attached with the same reference symbols, and their detailed explanation will be omitted.

First, in the machining program preparation apparatus, when the three-dimensional part shape 100 to be obtained is input from the part shape input unit 1 (step S1), it is possible to instruct whether a correction is to be made to the part shape 100 or not (step S21). When a correction is not to be made to the part shape 100, the process proceeds to step S2 and after, and a processing similar to that of the first embodiment is carried out.

On the other hand, when correction is to be made to the input part shape 100, for example, when it is desired to leave a machining region as a finishing margin in order to carry out a finish machining at a separate step, the need for the correction is indicated at step S21. Based on this, it is possible to correct the three-dimensional part shape 100 that has been input at step S1. In other words, when the need for the correction has been indicated at step S21, the part shape setting unit 20 can set a correction method and a correction quantity (step S22). For example, when it is desired to leave the machining region as the finishing margin in order to carry out finish machining at a separate step, the part shape setting unit 20 can set a correction method for expanding the part shape 100 and the finishing margin as a correction quantity.

When the correction method and the correction quantity have been set, the part shape correcting unit 21 then carries out the processing for a three-dimensional shape based on the correction method and the correction quantity of the part shape 100, thereby to correct the part shape 100 (step S23)

Thereafter, the processing same as that in the flowchart shown in FIG. 2 is carried out. Based on this, the three-dimensional shape of the turning region 500 to be machined at the turning step is output separately from the three-dimensional shape of the milling region 600 to be machined at the milling step, based on the three-dimensional part shape 100 and material shape 200. Further, the finishing margin is taken into account in the input part shape 100. Therefore, even when the envelope shape 400 has been generated to be in contact with the part shape 100 at step S4, the turning region 300 extracted at step S5 is prevented from being in contact with the milling region 600. Consequently, both the turning region 500 and the milling region 600 that are output include the finishing margin. Therefore, even if multi-machining including the milling and the turning is to be carried out, it is not necessary for the operator to separate the turning step from the milling step while looking at the part shape 100. As a result, it becomes possible to easily prepare a machining program based on a process design that accurately separates the turning step from the milling step, without requiring skill.

Fourth Embodiment:

A fourth embodiment of this invention will be explained below.

Figure 15:
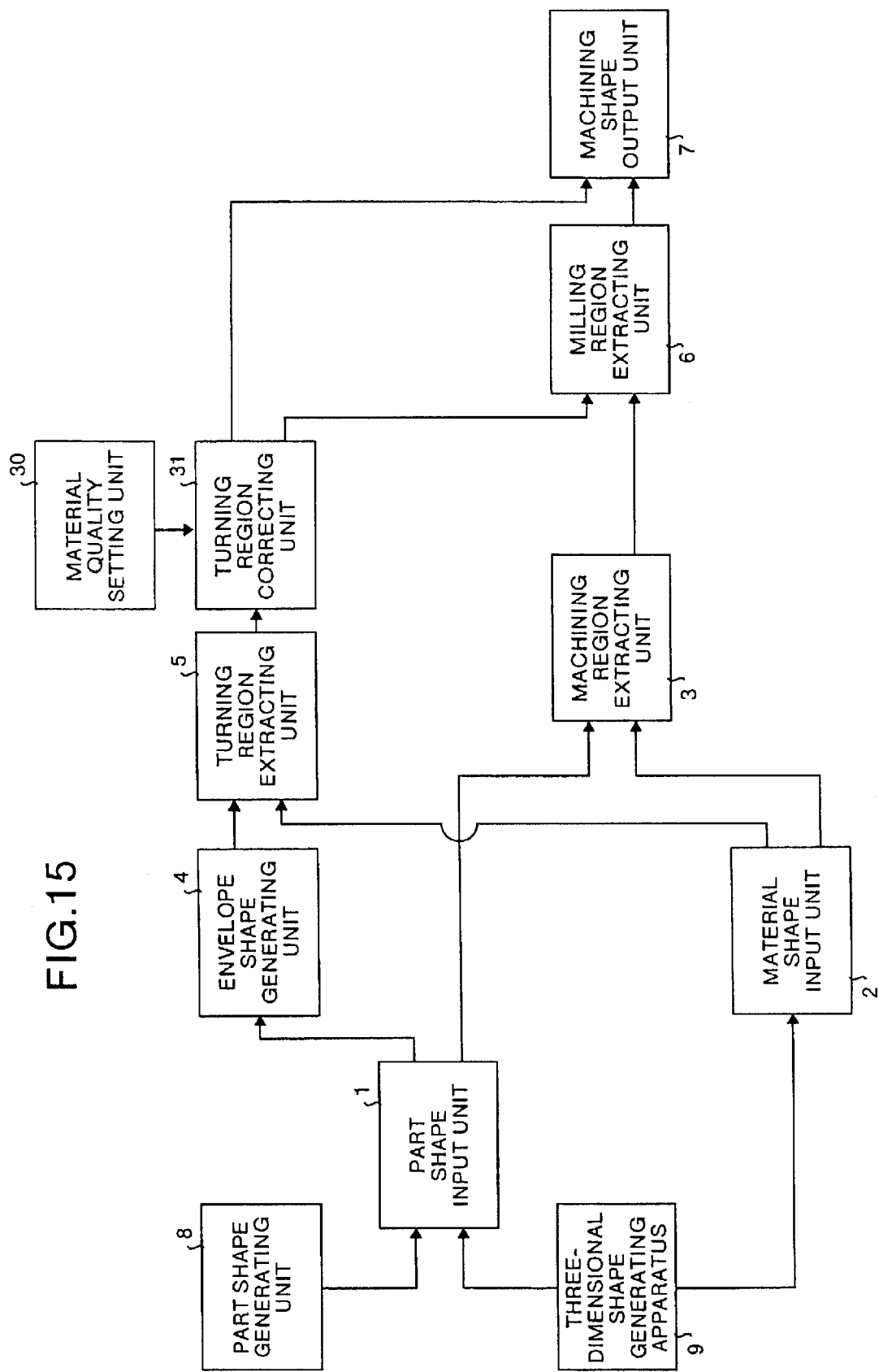
FIG. 15 is a block diagram which shows a structure of a machining program preparation apparatus as a fourth embodiment of this invention.

FIG. 15 is a block diagram which shows the structure of the machining program preparation apparatus as the fourth embodiment of this invention. As is clear from FIG. 15, the machining program preparation apparatus of the fourth embodiment further comprises a material quality setting unit 30 and a turning region correcting unit 31 in the machining program preparation apparatus of the first embodiment shown in FIG. 1. The material quality setting unit 30 is used to set quality information of a material. The turning region correcting unit 31 is used to make a correction to the turning region 500 given from the turning region extracting unit 5, based on the quality information of the material that has been set by the material quality setting unit 30 and a machining condition relating to the material quality that has been stored in advance. In FIG. 15, components equivalent to or corresponding to those in FIG. 1 will be attached with the same reference symbols, and their detailed explanation will be omitted.

Figure 16:
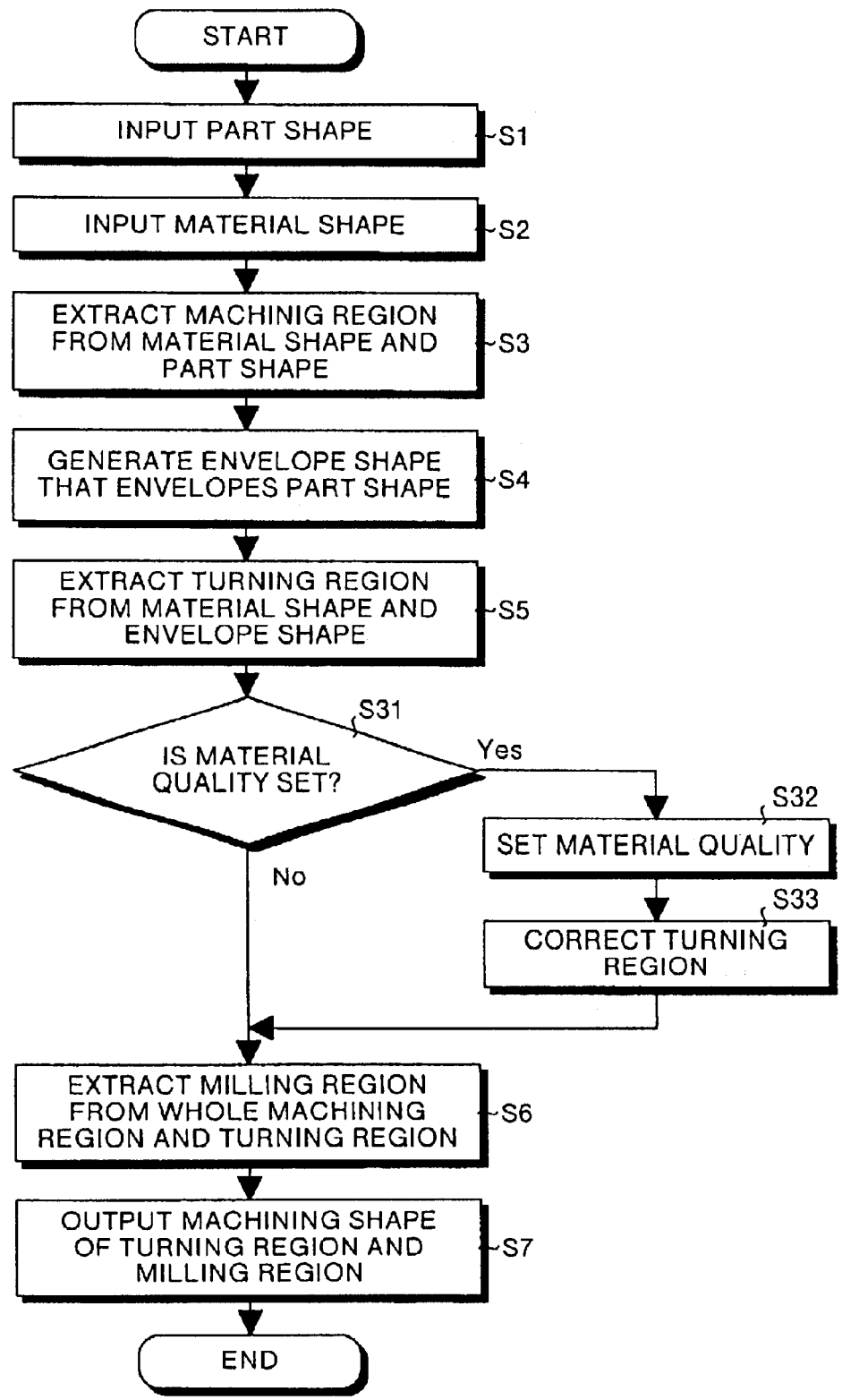
FIG. 16 is a flowchart which shows the operation of the machining program preparation apparatus of the fourth embodiment shown in FIG. 15.

FIG. 16 is a flowchart which shows the operation of the machining program preparation apparatus of the fourth embodiment shown in FIG. 15. The operation of the machining program preparation apparatus will be explained below with reference to this flowchart. In FIG. 16, portions equivalent to or corresponding to those in FIG. 2 will also be attached with the same reference symbols, and their detailed explanation will be omitted.

In the machining program preparation apparatus of the fourth embodiment, at step S5, when the turning region extracting unit 5 has extracted the turning region 500, it is possible to instruct whether quality of the material is to be set or not (step S31). When quality of the material is not to be set, the process proceeds to step S6 and on, and a processing similar to that of the first embodiment is carried out.

On the other hand, when the shape of the turning region 500 extracted by the turning region extracting unit 5 is thin and the margin is very small, for example, the turning region extracting unit maybe too soft to carryout the turning depending on the material quality. In this case, when the request for setting is issued at step S31, it is possible to make a correction to the turning region 500 extracted by the turning region extracting unit 5 (step S32). In other words, when the request for setting is issued at step S31, first, a quality name of the material can be set through the material quality setting unit 30. When the material quality setting unit 30 has set the quality name of the material, a machining condition for each material quality stored in advance, for example, a minimum thickness of a machining region shape that can be machined is obtained based on the set material quality name. Further, the turning region 500 extracted by the turning region extracting unit 5 is compared with the minimum thickness of the machining region shape. When the turning region 500 includes a portion that has a smaller thickness than the minimum thickness of the shape of the machining region, it is decided that this portion is not suitable for the turning to carry out the correction of removing this portion smaller than the minimum thickness from the turning region 500 (step S33).

With the above arrangement, at step S6, when a differential shape between the shape of the corrected turning region 500 and the shape of the machining region 300 extracted by the machining region extracting unit 3 is extracted, a thin shape portion that has been removed at step S33 is extracted as the milling region 600.

Thereafter, the processing same as that in the flowchart shown in FIG. 2 is carried out. Based on this, the three-dimensional shape of the turning region 500 to be machined at the turning step is separated from the three-dimensional shape of the milling region 600 to be machined at the milling step based on the three-dimensional part shape 100 and material shape 200, to output the three-dimensional shapes each corresponding to the material quality, respectively. Therefore, even if multi-machining including the milling and the turning is to be carried out, it is not necessary for the operator to separate the turning step from the milling step while looking at the part shape 100. As a result, it becomes possible to easily prepare a machining program based on a process design that accurately separates the turning step from the milling step, without requiring skill.

Fifth Embodiment:

A fifth embodiment of this invention will be explained below.

Figure 17:
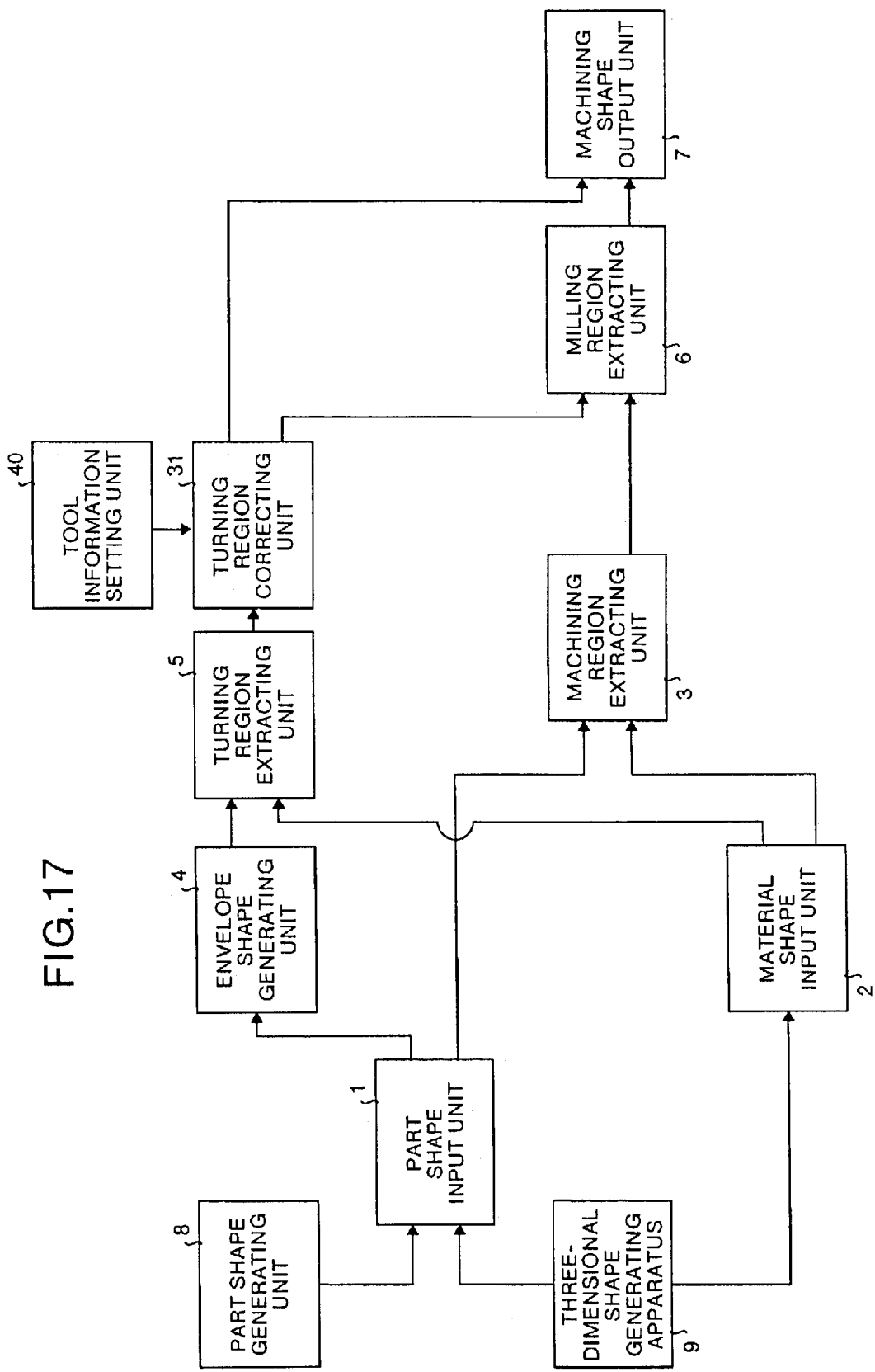
FIG. 17 is a block diagram which shows a structure of a machining program preparation apparatus as a fifth embodiment of this invention.

FIG. 17 is a block diagram which shows the structure of the machining program preparation apparatus as the fifth embodiment of this invention. As is clear from FIG. 17, the machining program preparation apparatus of the fifth embodiment further comprises a tool information setting unit 40 and the turning region correcting unit 31 in the machining program preparation apparatus of the first embodiment shown in FIG. 1. The tool information setting unit 40 is used to set information relating to the information of tools such as kinds of tools and the number of cutting edges to be used. The turning region correcting unit 31 is used to make a correction to the turning region 500 given from the turning region extracting unit 5, based on the tool information set by the tool information setting unit 40. In FIG. 17, components equivalent to or corresponding to those in FIG. 1 will be attached with the same reference symbols, and their detailed explanation will be omitted.

Figure 18:
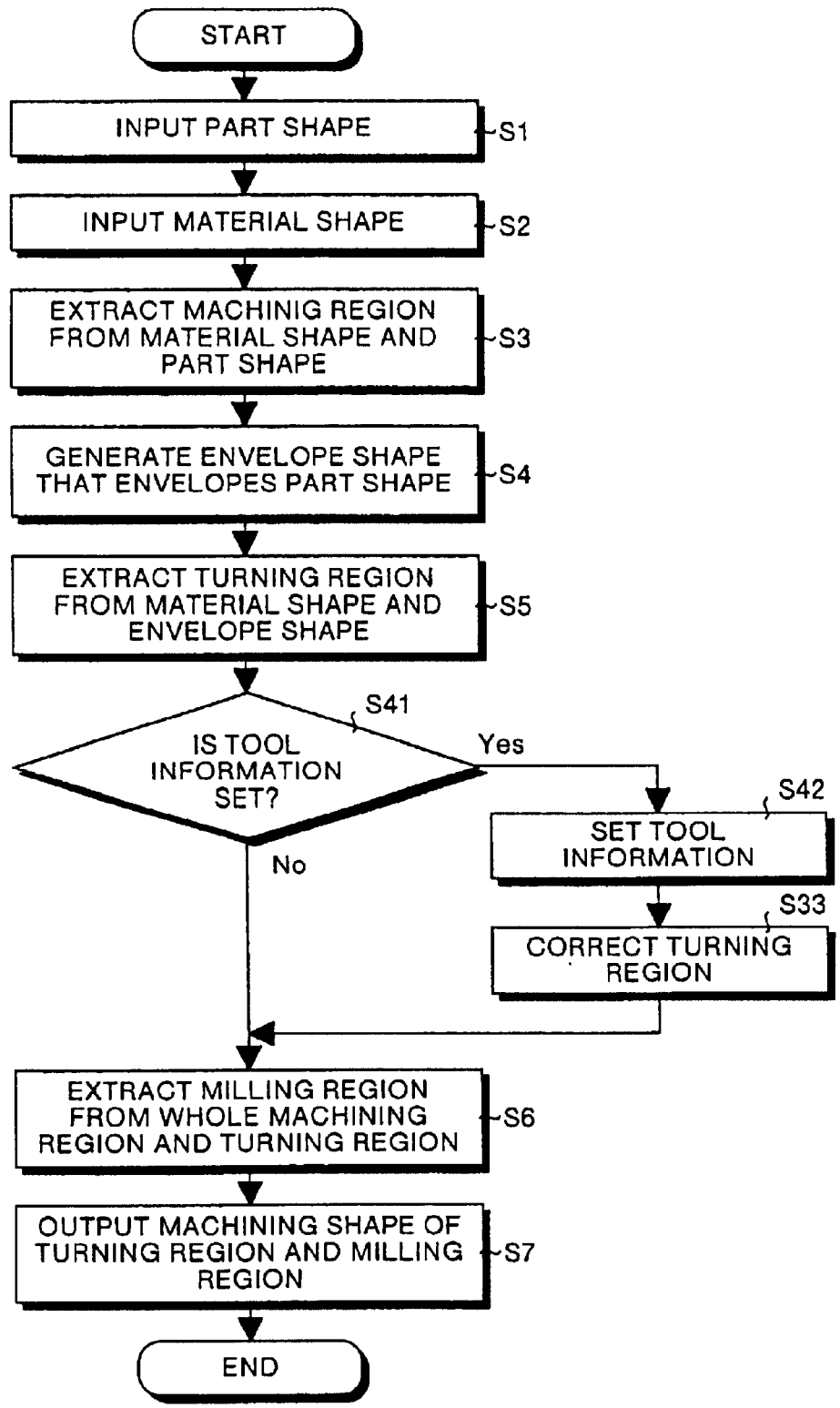
FIG. 18 is a flowchart which shows the operation of the machining program preparation apparatus of the fifth embodiment shown in FIG. 17.

FIG. 18 is a flowchart which shows the operation of the machining program preparation apparatus of the fifth embodiment shown in FIG. 17. The operation of the machining program preparation apparatus will be explained below with reference to this flowchart. In FIG. 18, portions equivalent to or corresponding to those in FIG. 2 will also be attached with the same reference symbols, and their detailed explanation will be omitted.

In the machining program preparation apparatus of this fifth embodiment, at step S5, when the turning region extracting unit 5 has extracted the turning region 500, it is possible to instruct whether tool information is to be set or not (step S41). When the tool information is not to be set, the process proceeds to step S6 and on, and a processing similar to that of the first embodiment is carried out.

On the other hand, there is some case where it is desired to remove an end surface portion from the turning region 500, such as a case where no tool for turning the end surface portion is available among tools that are used for machining. In such a case, when the request for setting is issued at step S41, it is possible to make a correction to the turning region 500 extracted by the turning region extracting unit 5 (step S42). In other words, when the request for setting is issued at step S41, tool information such as kinds of tools, the number of cutting edges, and the length of cutting edges to be used can be set in advance through the tool information setting unit 40. When the tool information has been set through the tool information setting unit 40, the turning region 500 extracted by the turning region extracting unit 5 is checked based on this set tool information. As a result of this check, when the turning region 500 includes a portion that cannot be machined by the set tool, for example, when the turning region 500 includes an end surface portion although a machining tool for turning the end surface has not been set, it is decided that this portion is not suitable for turning, and the correction of removing this end surface portion from the turning region 500 is carried out (step S33).

With the above arrangement, at step S6, when a differential shape between the shape of the corrected turning region 500 and the shape of the machining region 300 extracted by the machining region extracting unit 3 is extracted, an end surface portion that has been removed at step S33 is extracted as the milling region 600.

Thereafter, the processing same as that in the flowchart shown in FIG. 2 is carried out. Based on this, the three-dimensional shape of the turning region 500 to be machined at the turning step is separated from the three-dimensional shape of the milling region 600 to be machined at the milling step based on the three-dimensional part shape 100 and material shape 200 to output the three-dimensional shapes corresponding to the respective tool information, respectively. Therefore, even if multi-machining including the milling and the turning is to be carried out, it is not necessary for the operator to separate the turning step from the milling step while looking at the part shape 100. As a result, it becomes possible to easily prepare a machining program based on the process design that accurately separates the turning step from the milling step, without requiring skill.

Sixth Embodiment:

A sixth embodiment of this invention will be explained below.

Figure 19:
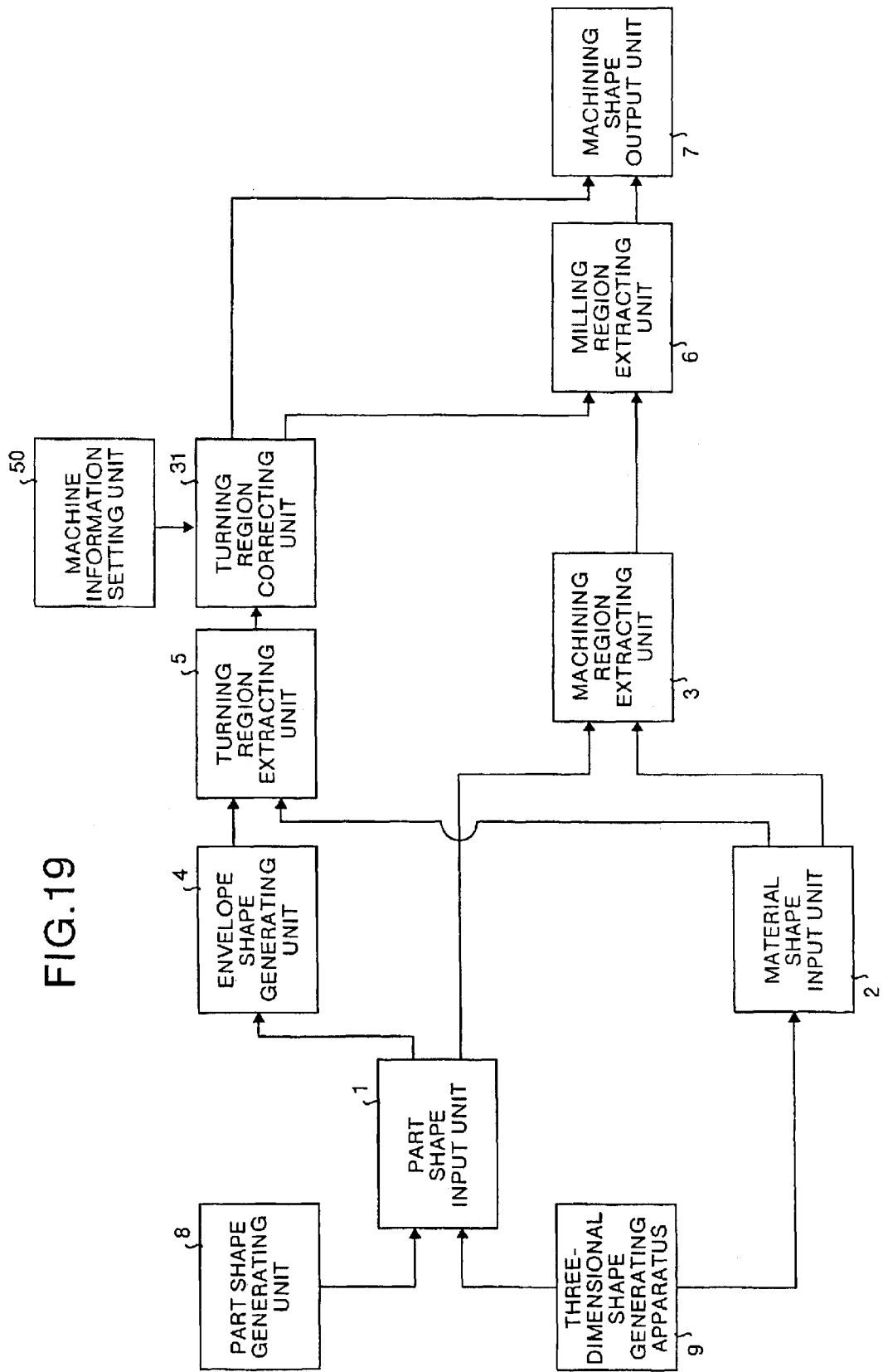
FIG. 19 is a block diagram which shows a structure of a machining program preparation apparatus as a sixth embodiment of this invention.

FIG. 19 is a block diagram which shows the structure of a machining program preparation apparatus as the sixth embodiment of this invention. As is clear from FIG. 19, the machining program preparation apparatus of the sixth embodiment further comprises a machine information setting unit 50 and the turning region correcting unit 31 in the machining program preparation apparatus of the first embodiment shown in FIG. 1. The machine information setting unit 50 is used to set various kinds of information relating to the machining center such as a type and an axial structure of a machine, a movement quantity of each axis, a maximum machining length, or a main axis rotation speed. In FIG. 19, components equivalent to or corresponding to those in FIG. 1 will be attached with the same reference symbols, and their detailed explanation will be omitted.

Figure 20:
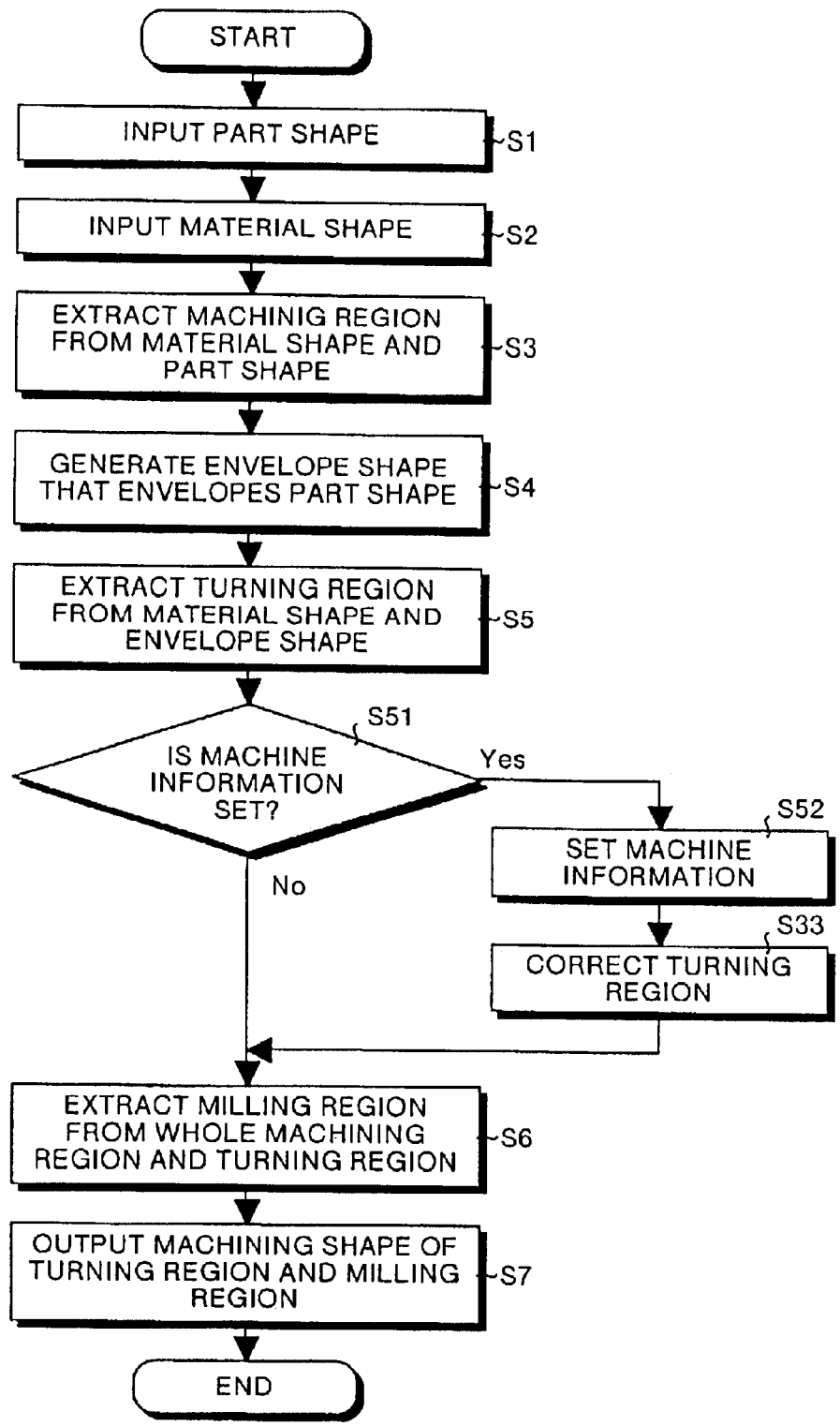
FIG. 20 is a flowchart which shows the operation of the machining program preparation apparatus of the sixth embodiment shown in FIG. 19.

FIG. 20 is a flowchart which shows the operation of the machining program preparation apparatus of the sixth embodiment shown in FIG. 19. The operation of the machining program preparation apparatus will be explained below with reference to this flowchart. In FIG. 20, portions equivalent to or corresponding to those in FIG. 2 will also be attached with the same reference symbols, and their detailed explanation will be omitted.

In the machining program preparation apparatus of this sixth embodiment, at step S5, when the turning region extracting unit 5 has extracted the turning region 500, it is possible to instruct whether machine information is to be set or not (step S51). When the machine information is not to be set, the process proceeds to step S6 and on, and a processing similar to that of the first embodiment is carried out.

On the other hand, there is some case where it is desired to remove an end surface portion at the rear surface side from the turning region 500, such as a case where the machining center is a lathe that is not provided with a second main axis. In this case, when the request for setting is issued at step S51, it is possible to make a correction to the turning region 500 extracted by the turning region extracting unit 5 (step S52). In other words, when the request for setting has been issued at step S51, it is possible to set machine information such as a kind of machine, an axial structure, a movement quantity of each axis, a maximum machining length, or a rotation speed of a main axis through the machine information setting unit 50. When the machine information has been set through the machine information setting unit 50, the turning region 500 extracted by the turning region extracting unit 5 is checked based on this set machine information. As a result of this check, when the turning region 500 includes a portion that cannot be machined by the set machining center, for example, when the turning region 500 includes an end surface portion at the rear surface side although the machining center is a lathe that is not provided with the second main axis, it is decided that this portion is not suitable for turning, and the correction of removing this end surface portion from the turning region 500 is carried out (step S33).

With the above arrangement, at step S6, when a differential shape between the shape of the corrected turning region 500 and the shape of the machining region 300 extracted by the machining region extracting unit 3 is extracted, an end surface portion that has been removed at step S33 is extracted as the milling region 600.

Thereafter, the processing same as that in the flowchart shown in FIG. 2 is carried out. Based on this, the three-dimensional shape of the turning region 500 to be machined at the turning step is separated from the three-dimensional shape of the milling region 600 to be machined at the milling step based on the three-dimensional part shape 100 and material shape 200 to output the three-dimensional shapes each corresponding to the machine information, respectively. Therefore, even if multi-machining including the milling and the turning is to be carried out, it is not necessary for the operator to separate the turning step from the milling step while looking at the part shape 100. As a result, it becomes possible to easily prepare a machining program based on the process design that accurately separates the turning step from the milling step, without requiring skill.

Seventh Embodiment:

A seventh embodiment of this invention will be explained below.

Figure 21:
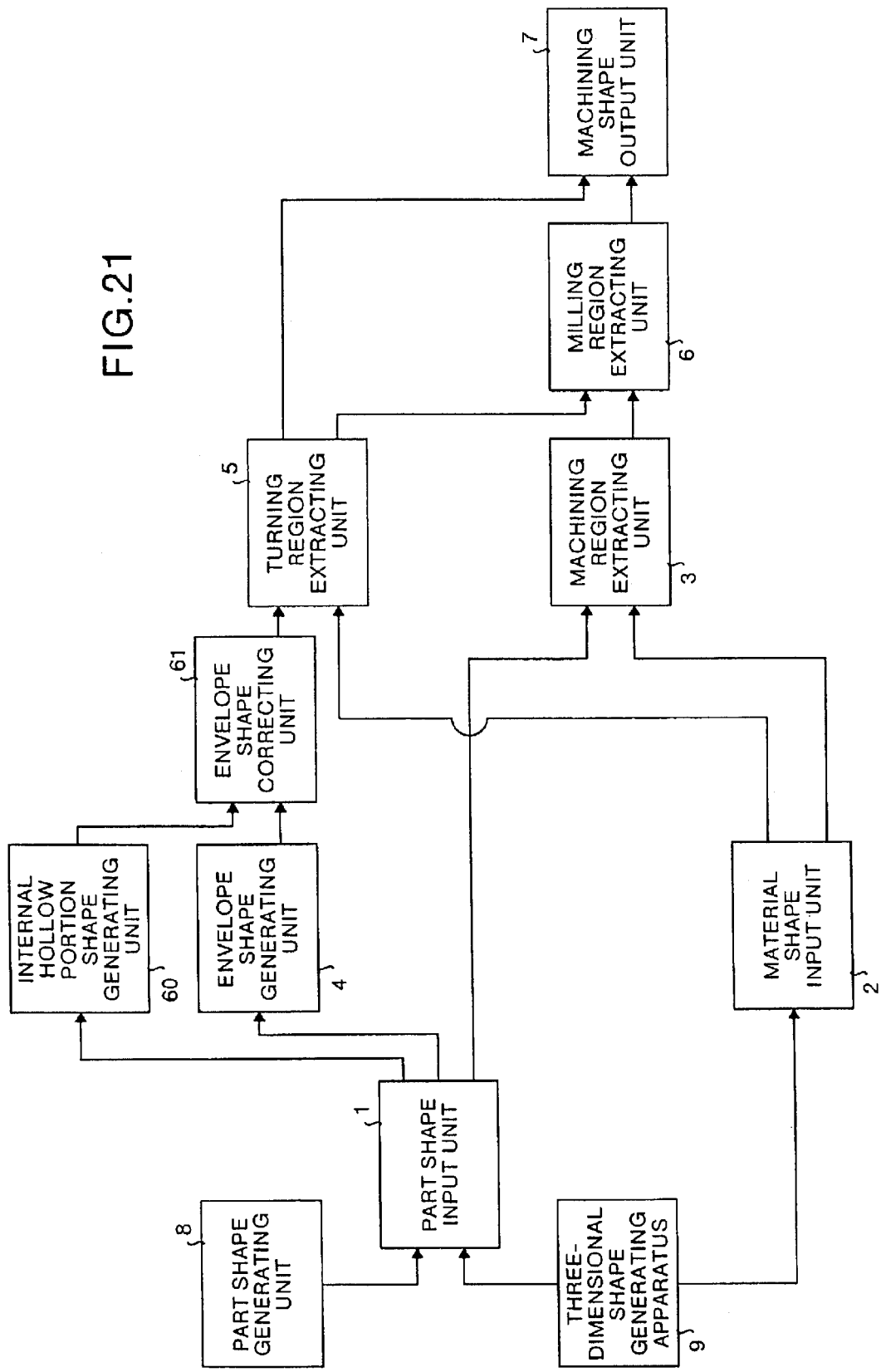
FIG. 21 is a block diagram which shows a structure of a machining program preparation apparatus as a seventh embodiment of this invention.

FIG. 21 is a block diagram which shows the structure of the machining program preparation apparatus as the seventh embodiment of this invention. As is clear from FIG. 21, the machining program preparation apparatus of the seventh embodiment further comprises an internal hollow portion shape generating unit 60 and an envelope shape correcting unit 61 in the machining program preparation apparatus of the first embodiment shown in FIG. 1. The internal hollow portion shape generating unit 60 is used to generate a three-dimensional hollow portion-equivalent shape 100a'' when a part shape 100'' input from the part shape input unit 1 has the internal hollow portion 100a'' that can be turned. The envelope shape correcting unit 61 is used to make a correction to the envelope shape 400 given from the envelope shape generating unit 4, based on the hollow portion-equivalent shape 100a'' generated by the internal hollow portion shape generating unit 60. In FIG. 21, components equivalent to or corresponding to those in FIG. 1 will be attached with the same reference symbols, and their detailed explanation will be omitted.

Figure 22:
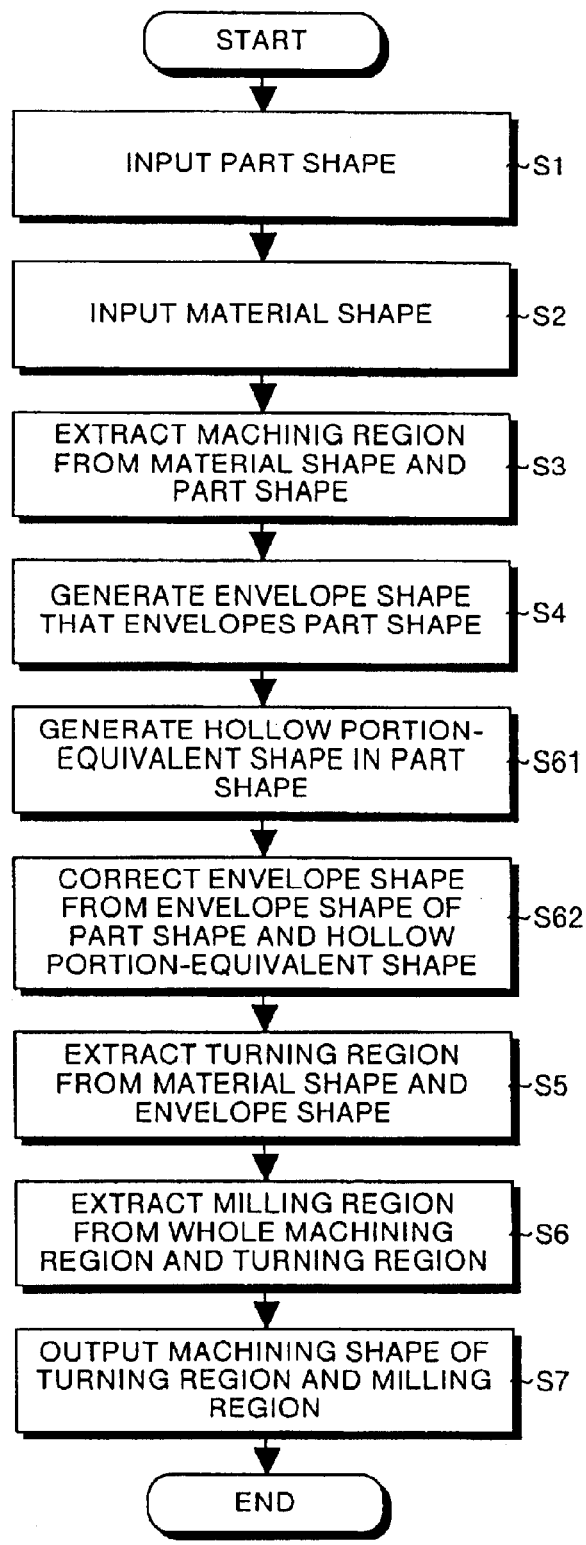
FIG. 22 is a flowchart which shows the operation of the machining program preparation apparatus of the seventh embodiment shown in FIG. 21.

FIG. 22 is a flowchart which shows the operation of the machining program preparation apparatus of the seventh embodiment shown in FIG. 21. The operation of the machining program preparation apparatus will be explained below with reference to this flowchart. In FIG. 22, portions equivalent to or corresponding to those in FIG. 2 will also be attached with the same reference symbols, and their detailed explanation will be omitted. However, in this seventh embodiment, at step S1, data for the part shape 100'' having the internal hollow portion 100a'' that can be turned as shown in FIG. 23(a) is input through the part shape input unit 1.

In the machining program preparation apparatus of this seventh embodiment, at step S4, the envelope shape generating unit 4 generates an envelope shape 400 that envelopes the part shape 100'' for the three-dimensional part shape 100'' input at step S1 (step S4). In this case, when the envelope shape 400 is generated for the part shape 100'' shown in FIG. 23(a) in a similar manner to that of the first embodiment, the internal hollow portion 100a'' that can be turned is included inside the envelope shape 400 as shown in FIG. 23(b). When the turning region 500 is extracted based on this envelope shape 400, it becomes impossible to extract the internal hollow portion 100a'' as the turning region 500.

Therefore, in the machining program preparation apparatus of the seventh embodiment, the internal hollow portion shape generating unit 60 generates the cylindrical hollow portion-equivalent shape 100b'' corresponding to the internal hollow portion 100a'' from the three-dimensional part shape 100'', as shown in FIG. 23(c) (step S61) Specifically, a cylindrical shape is generated in a minimum diameter around the turning axial core a that has been set at the time of generating the envelope shape 400 at step S4, and this is used as the shape 100'' of the internal hollow portion.

Next, the envelope shape correcting unit 61 makes a correction to the envelope shape 400 generated at step S4, based on the hollow portion-equivalent shape 100b'' generated at step S61 (step S62) Specifically, as shown in FIG. 23(d), the shape 100b'' of the internal hollow portion is removed from the envelope shape 400 that includes the part shape 100'', thereby to generate the corrected envelope shape 400''.

With the above arrangement, at step S5, it is possible to obtain the turning region 500 including the internal hollow portion 100a'', by extracting a differential shape in this corrected envelope shape 400'' from the material shape 200.

Thereafter, the processing same as that in the flowchart shown in FIG. 2 is carried out. Based on this, the three-dimensional shape of the turning region 500 that includes the internal hollow portion 100a'' to be machined at the turning step is output separately from the three-dimensional shape of the milling region 600 to be machined at the milling step based on the three-dimensional part shape 100 and material shape 200. Therefore, even if multi-machining including the milling and the turning is to be carried out, it is not necessary for the operator to separate the turning step from the milling step while looking at the part shape 100. As a result, it becomes possible to easily prepare a machining program based on the process design that accurately separates the turning step from the milling step, without requiring skill.

As explained above, according to this invention, it is possible to obtain the three-dimensional shape of the turning region and the three-dimensional shape of the milling region, based on the three-dimensional part shape and material shape. Therefore, even if multi-machining including the milling and the turning is to be carried out, it is not necessary for the operator to separate the turning step from the milling step while looking at the part shape. As a result, it becomes possible to easily prepare a machining program based on the process design that accurately separates the turning step and the milling step, without requiring skill.

According to the next invention, it is possible to prepare an envelope shape using the turning axial core as a rotation axis based on a given part shape. Therefore, it is possible to decide that the envelope shape can be turned as it is and to accurately separate the turning step from the milling step.

According to the next invention, when the two-dimensional shape information is set through the material shape setting unit, the material shape generating unit can generate a three-dimensional material shape. Therefore, it becomes possible to easily input a material shape.

According to the next invention, when the correction information of a part shape is set through part shape setting unit, the part shape correcting unit can make a correction to the part shape. Therefore, it becomes possible to prepare the machining program based on the turning step and the milling step that have been divided by taking into account the finishing margin.

According to the next invention, when the material information is set through the material quality setting unit, the turning region correcting unit can make a correction to the turning region. Therefore, even if the shape of the turning region extracted by the turning region extracting unit is thin and the margin is very small, it is possible to correct this as a milling region depending on the material quality. As a result, it becomes possible to separate the turning step from the milling step more properly.

According to the next invention, when the information relating to tools is set through the tool information setting unit, the turning region correcting unit can make a correction to the turning region. Therefore, even if there is no tool for turning the end surface portion among tools that are used for the machining, it is possible to remove the end surface portion from the turning region, thereby to correct the region as a milling region. As a result, it becomes possible to separate the turning step from the milling step more properly.

According to the next invention, when the information relating to the machining center is set through the machine information setting unit, the turning region correcting unit can make a correction to the turning region. Therefore, even if the machining center is a lathe that is not provided with the second main axis, it is possible to remove the end surface portion at the rear surface side from the turning region, thereby to correct the region as a milling region. As a result, it becomes possible to separate the turning step from the milling step more properly.

According to the next invention, when the three-dimensional part shape has the internal hollow portion that can be turned, the internal hollow portion shape generating unit generates the hollow portion-equivalent shape. Further, the envelope shape correcting unit makes a correction to the envelope shape so as to envelope the hollow portion-equivalent shape. As a result, it becomes possible to separate the turning step from the milling step more properly.

INDUSTRIAL APPLICABILITY

As explained above, according to the machining program preparation apparatus relating to the present invention, the apparatus is suitable for a machining program preparation apparatus that prepares a machining program for a machining center that executes milling and turning.

What is claimed is:

1. A machining program preparation apparatus that prepares a machining program for a machining center that executes milling and turning, the machining program preparation apparatus comprising:
    a machining region extracting unit that extracts a machining region based on a given three-dimensional part shape and a given three-dimensional material shape;
    an envelope shape generating unit that generates a three-dimensional envelope shape that envelopes the given three-dimensional part shape based on this part shape;
    a turning region extracting unit that extracts a three-dimensional turning region from the material shape and the envelope shape; and
    a milling region extracting unit that extracts a three-dimensional milling region from the machining region extracted by the machining region extracting unit and the turning region extracted by the turning region extracting unit.

2. The machining program preparation apparatus according to claim 1, wherein the envelope shape generating unit sets a turning axial core that becomes a rotation axis at the time of turning, prepares across-sectional shape that passes through a point farthest from the turning axial core among end points of the part shape, and generates an envelope shape by rotating the cross-sectional shape around the turning axial core.

3. The machining program preparation apparatus according to claim 1, further comprising:
    a material shape setting unit that sets information for a two-dimensional shape of a material; and
    a material shape generating unit that generates a three-dimensional material shape based on the two-dimensional shape information set by the material shape setting unit, and gives the generated shape to the machining region extracting unit and the turning region extracting unit.

4. The machining program preparation apparatus according to claim 1, further comprising:
    a part shape setting unit that sets correction information of a part shape to a given three-dimensional part shape; and
    a part shape correcting unit that makes a correction to the three-dimensional part shape based on the correction information set by the part shape setting unit, and gives the corrected shape to the machining region extracting unit and the envelope shape generating unit.

5. The machining program preparation apparatus according to claim 1, further comprising:
    a material quality setting unit that sets material information to a given material shape; and
    a turning region correcting unit that makes a correction to the turning region based on the material information set by the material quality setting unit, and gives the corrected turning region to the milling region extracting unit.

6. The machining program preparation apparatus according to claim 1, further comprising:
    a tool information setting unit that sets information relating to tools of the machining center; and
    the turning region correcting unit that makes a correction to the turning region based on the information relating to the tools set by the tool information setting unit, and gives the corrected turning region to the milling region extracting unit.

7. The machining program preparation apparatus according to claim 1, further comprising:
    a machine information setting unit that sets information relating to the machining center; and
    the turning region correcting unit that makes a correction to the turning region based on the information relating to the machining center set by the machine information setting unit, and gives the corrected turning region to the milling region extracting unit.

8. The machining program preparation apparatus according to claim 1, further comprising:
    an internal hollow portion shape generating unit that generates a hollow portion-equivalent shape corresponding to an internal hollow portion when a given three-dimensional part shape has the internal hollow portion that can be turned; and
    an envelope shape correcting unit that makes a correction to the envelope shape based on the hollow portion-equivalent shape generated by the internal hollow portion shape generating unit, and gives the corrected shape to the turning region extracting unit.

* * * * *